US011610606B1

(12) United States Patent
Jenni et al.

(10) Patent No.: US 11,610,606 B1
(45) Date of Patent: Mar. 21, 2023

(54) RETIMING DIGITAL VIDEOS UTILIZING MACHINE LEARNING AND TEMPORALLY VARYING SPEEDS

(71) Applicant: Adobe Inc., San Jose, CA (US)

(72) Inventors: Simon Jenni, Wangen bei Olten (CH); Markus Woodson, Santa Clara, CA (US); Fabian David Caba Heilbron, Campbell, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/652,586

(22) Filed: Feb. 25, 2022

(51) Int. Cl.
  *H04N 5/783* (2006.01)
  *G11B 27/00* (2006.01)
(52) U.S. Cl.
  CPC .................. *G11B 27/005* (2013.01)
(58) Field of Classification Search
  CPC .................................................. G11B 27/005
  USPC ................................ 386/343, 345, 347, 350
  See application file for complete search history.

(56) References Cited

U.S. PATENT DOCUMENTS

2021/0004589 A1\* 1/2021 Turkelson .............. G06V 10/82

FOREIGN PATENT DOCUMENTS

| JP | 101213606 A | \* | 7/2008 |
| JP | 114040228 A | \* | 2/2022 |

OTHER PUBLICATIONS

Sagie Benaim, Ariel Ephrat, Oran Lang, Inbar Mosseri, William T Freeman, Michael Rubinstein, Michal Irani, and Tali Dekel. Speednet: Learning the speediness in videos. In Proceedings of the IEEE/CVF Conference on Computer Vision and Pattern Recognition, pp. 9922-9931, 2020.

Dave Epstein, Boyuan Chen, and Carl Vondrick. Oops! predicting unintentional action in video. In Proceedings of the IEEE/CVF Conference on Computer Vision and Pattern Recognition, pp. 919-929, 2020.

Simon Jenni, Givi Meishvili, and Paolo Favaro. Video representation learning by recognizing temporal transformations. arXiv preprint arXiv:2007.10730, 2020.

(Continued)

*Primary Examiner* — Robert Chevalier
(74) *Attorney, Agent, or Firm* — Keller Preece PLLC

(57) ABSTRACT

This disclosure describes one or more implementations of systems, non-transitory computer-readable media, and methods that generate a temporally remapped video that satisfies a desired target duration while preserving natural video dynamics. In certain instances, the disclosed systems utilize a playback speed prediction machine-learning model that recognizes and localizes temporally varying changes in video playback speed to re-time a digital video with varying frame-change speeds. For instance, to re-time the digital video, the disclosed systems utilize the playback speed prediction machine-learning model to infer the slowness of individual video frames. Subsequently, in certain embodiments, the disclosed systems determine, from frames of a digital video, a temporal frame sub-sampling that is consistent with the slowness predictions and fit within a target video duration. In certain implementations, the disclosed systems utilize the temporal frame sub-sampling to generate a speed varying digital video that preserves natural video dynamics while fitting the target video duration.

20 Claims, 11 Drawing Sheets

(56) References Cited

OTHER PUBLICATIONS

Ilya Loshchilov and Frank Hutter. Sgdr: Stochastic gradient descent with warm restarts. arXiv preprint arXiv:1608.03983, 2016.
Ilya Loshchilov and Frank Hutter. Fixing weight decay regularization in adam. arXiv preprint arXiv:1711.05101, 2017.
Du Tran, Heng Wang, Lorenzo Torresani, Jamie Ray, Yann LeCun, and Manohar Paluri. A closer Took at spatiotemporal convolutions for action recognition. In Proceedings of the IEEE conference on Computer Vision and Pattern Recognition, pp. 6450-6459, 2018.
Yuan Yao, Chang Liu, Dezhao Luo, Yu Zhou, and Qixiang Ye. Video playback rate perception for self-supervised spatio-temporal representation learning. In Proceedings of the IEEE/CVF Conference on Computer Vision and Pattern Recognition, pp. 6548-6557, 2020.
Andrew Zisserman, Joao Carreira, Karen Simonyan, Will Kay, Brian Zhang, Chloe Hillier, Sudheendra Vijayanarasimhan, Fabio Viola, Tim Green, Trevor Back, et al. The kinetics human action video dataset. ArXiv, 2017.

\* cited by examiner

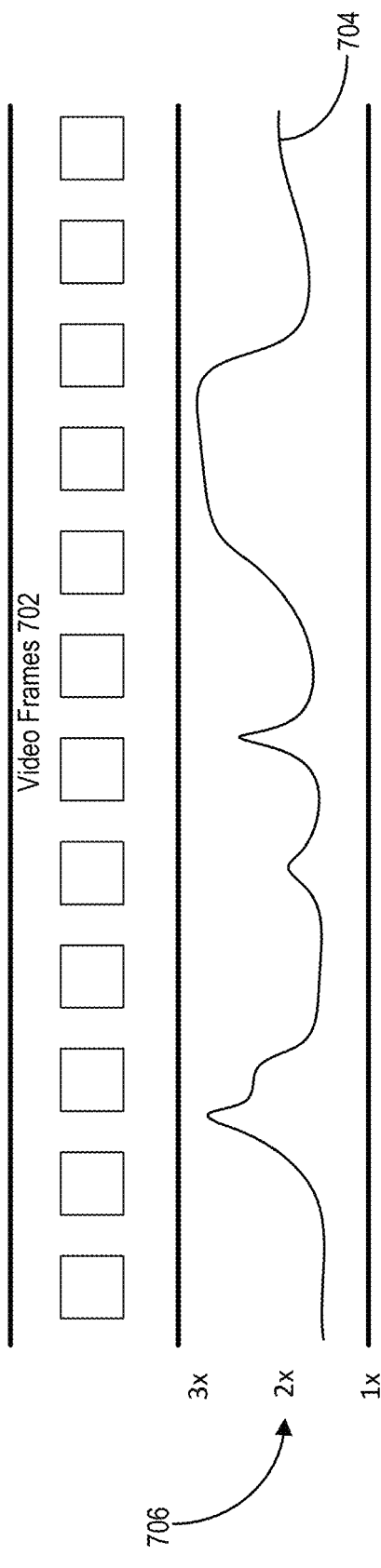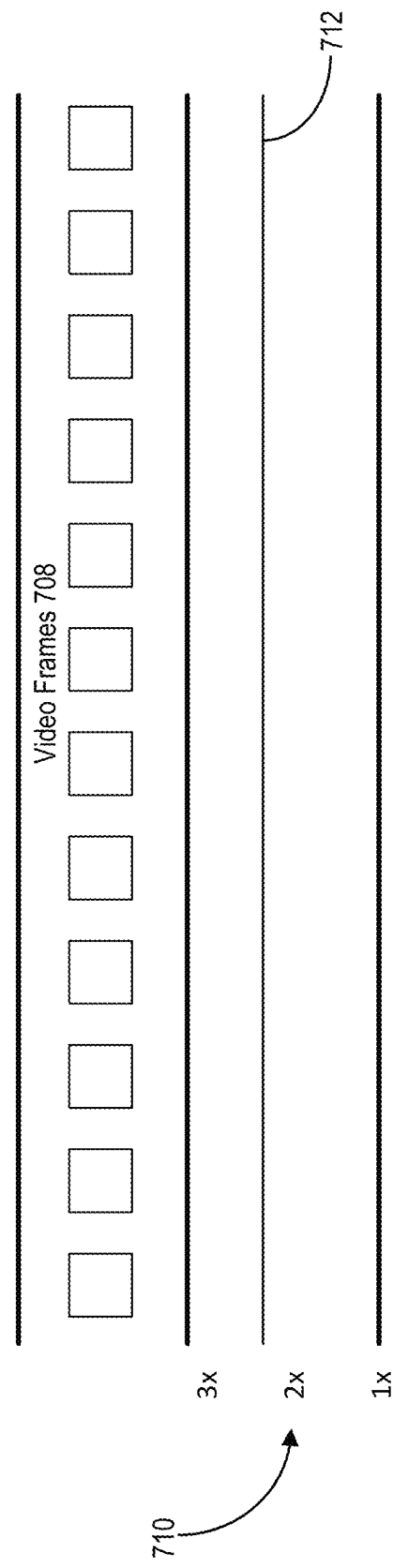

RETIMING DIGITAL VIDEOS UTILIZING MACHINE LEARNING AND TEMPORALLY VARYING SPEEDS

BACKGROUND

Recent years have seen a rapid increase in the creation and modification of digital content. For example, individuals and businesses increasingly utilize computing devices to create, upload, modify, and view digital content such as digital videos. Many practical use cases of digital videos require that the digital videos satisfy video length constraints. For example, many content publishers impose video length restrictions for digital videos for uploading and streaming on the content publisher platforms. Additionally, individuals and businesses often attempt to combine digital videos with digital audio which often requires fitting the length of the digital video into the length of the digital audio. In many cases, digital graphics tools are often utilized to modify a playback speed of digital videos to fit a video length constraint. Although conventional digital content modification systems often modify playback speeds of digital videos, these conventional systems have a number of shortcomings with regard to accuracy, flexibility, and efficiency in producing realistic and viewable digital videos with modified playback speeds.

In regard to accuracy, conventional digital content modification systems often modify playback speeds of digital videos to generate frame transitions with unnatural and unrealistic portrayal of scenes within the digital video. In particular, many conventional digital content modification systems utilize uniform playback speed modifications for an entire sequence of digital video frames. This approach often results in videos with unrealistic and noticeable speed ups in digital videos having a variety of slower scenes and action rich scenes. In some cases, to resolve the issues of uniform playback speed modifications, conventional digital content modification systems utilize a sliding window approach to introduce localized changes in playback speeds of digital videos. However, utilizing a sliding window approach assigns speed predictions to middle frames of the sliding window and is often inaccurate when speed changes could occur in different frames of the sliding window. Oftentimes, the errors in the frame speed-ups accumulate in the sliding window approach such that conventional digital content modification systems experience increasing degradation of performance for longer digital videos.

In addition, many conventional digital content modification systems apply rigid algorithms to adjust a time of a video. To illustrate, many conventional digital content modification systems that utilize uniform playback speed modifications can sometimes adjust the during of videos with uniform or similar scenes, but cannot adjust videos with diverse scenes without depicting such diverse scenes with unnatural timing. Indeed, such conventional digital content modification systems cannot easily modify digital videos to fit a desired video duration as the uniform speed up results in unusable and unrealistic content when a digital video has diverse scene attributes (e.g., a range of static scenes, action-packed scenes, and moving camera angles).

In addition, many conventional digital content modification systems that utilize a sliding window approach fail to flexibly accommodate lengthy digital videos (e.g., due to the increasing degradation of performance for longer digital videos). Furthermore, many conventional digital content modification systems utilize the sliding window approach to optimize for a target per-frame speed-up factor that is averaged over the source video sequence or utilize low-level heuristics (e.g., motion magnitude) that avoid scene semantics. Such a sliding window approach often results in a limited and indirect control over the output duration such that conventional digital content modification systems often cannot match a desired video length or is only able to offer a limited range of length reduction (e.g., below ten percent of the digital video). Moreover, some conventional digital content modification systems enable manual localization of speed ups at segments of digital videos. However, such an approach is intractable because frame speed is temporally tightly localized and, in many cases, is difficult to detect within a digital video.

Finally, conventional digital content modification systems that attempt to localize playback speeds of a digital video often inefficiently run an inordinate amount of calculations. For example, many conventional digital content modification systems that utilize a sliding window approach require applying a prediction network for frame speeds multiple times for each of the window segments. This often results in an inefficient (computationally expensive) number of calculations per digital video while remaining inaccurate and inflexible for a range of digital videos.

SUMMARY

This disclosure describes one or more implementations of systems, non-transitory computer readable media, and methods that solve one or more of the foregoing problems by generating a temporally remapped video that satisfies a desired target duration while preserving natural video dynamics. In particular, in one or more embodiments, the disclosed systems utilize a playback speed prediction machine-learning model that recognizes and accurately localizes temporally varying changes in video playback speed to re-time a digital video with varying frame-change speeds. For instance, to re-time the digital video, the disclosed systems utilize the playback speed prediction machine-learning model to infer the slowness of individual video frames. Subsequently, in one or more embodiments, the disclosed systems determine, from frames of a digital video, a temporal frame sub-sampling that is consistent with the slowness predictions from the playback speed prediction machine-learning model and fit within a target video duration. Indeed, the disclosed systems can utilize the temporal frame sub-sampling to generate a modified digital video that includes temporally varying playback speeds at different segments of the digital video to satisfy the target video duration.

BRIEF DESCRIPTION OF THE DRAWINGS

The detailed description is described with reference to the accompanying drawings in which:

FIGS. 7A and 7B illustrate differences between a digital video with localized and temporally varying playback speeds in comparison to a uniform playback speed in accordance with one or more implementations.

DETAILED DESCRIPTION

Figure 1:
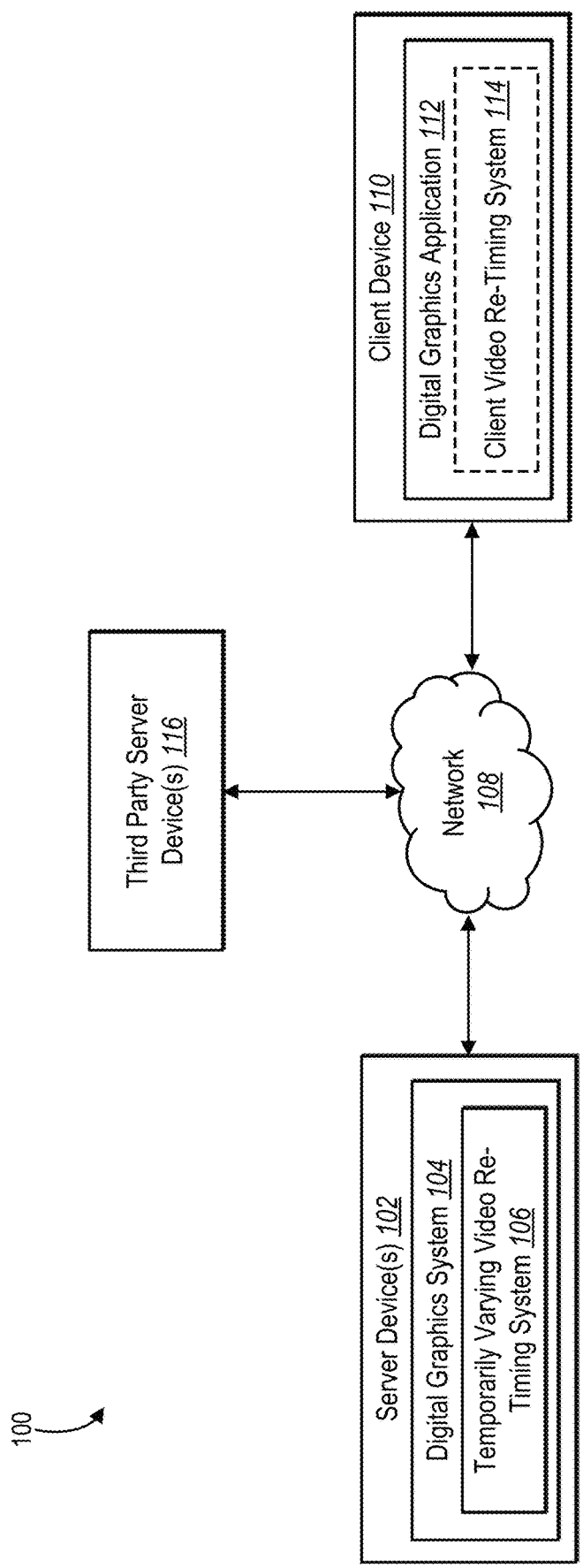
FIG. 1 illustrates a schematic diagram of an example environment in which a temporally varying video re-timing system operates in accordance with one or more implementations.

This disclosure describes one or more implementations of a temporally varying video re-timing system that generates a modified digital video that fits a target digital video duration using temporally varying playback speeds at different segments of the digital video. For example, the temporally varying video re-timing system determines, utilizing a playback speed prediction machine-learning model, varying predicted playback speeds of frames of a digital video. Subsequently, in one or more embodiments, the temporally varying video re-timing system utilizes the varying predicted playback speeds and a target video duration to determine a video frame sub-sampling from frames of the digital video (to fit the target video duration). Indeed, in some embodiments, the temporally varying video re-timing system utilizes the video frame sub-sampling to generate a speed varying digital video (from the digital video) that satisfies a target video duration while preserving natural video dynamics via different playback speeds at different segments of the digital video.

For instance, the temporally varying video re-timing system trains a playback speed prediction machine-learning model via self-supervision to recognize and localize temporally varying changes in playback speeds of a digital video. In particular, in one or more embodiments, the temporally varying video re-timing system (randomly) samples frame skips of a digital video to generate training data. Subsequently, in certain instances, the temporally varying video re-timing system, utilizing a playback speed prediction machine-learning model, determines varying predicted playback speeds of frames of the sampled digital video (with frame skips) to indicate varying speed classifications based on likelihoods of observing changes in playback speed between frames of the sampled digital video. Additionally, in one or more embodiments, the temporally varying video re-timing system utilizes a classification loss between the predicted varying predicted playback speeds of frames of the sampled digital video and the actual (ground truth) playback speeds of the frames in the sampled digital video to learn parameters of the playback speed prediction machine-learning model.

Furthermore, in some instances, the temporally varying video re-timing system receives a request to re-time a digital video using a target video duration. Indeed, the temporally varying video re-timing system can utilize the playback speed prediction machine-learning model with a video re-timing model to determine a video frame sub-sampling for the digital video that fits the target video duration. Indeed, in one or more embodiments, the temporally varying video re-timing system can utilize the video frame sub-sampling to generate a speed varying digital video (with different playback speeds at different segments of the digital video) that satisfies a target video duration.

To illustrate, in one or more embodiments, the temporally varying video re-timing system first utilizes a playback speed prediction machine-learning model to determine varying predicted playback speeds of a digital video. For example, the temporally varying video re-timing system generates a varying playback speed prediction vector from the digital video that translates to per-frame slowness predictions. In particular, in one or more embodiments, the temporally varying video re-timing system utilizes the playback speed prediction machine-learning model with a sped-up version of the digital video to determine a playback speed prediction vector indicating playback speed classifications for the sped-up version of the digital video. In some cases, the temporally varying video re-timing system interpolates the playback speed prediction vector of the sped-up version to a normal playback speed prediction vector that fits a source duration of an original version of the digital video.

Moreover, in some embodiments, the temporally varying video re-timing system translates playback speed classifications of the normal playback speed prediction vector to per-frame slowness predictions for the digital video. In one or more embodiments, the temporally varying video re-timing system 106 utilizes the per-frame slowness predictions to indicate the likelihood of a frame being slower than the default playback speed of the sped-up version of the digital video.

Additionally, in some embodiments, the temporally varying video re-timing system utilizes the varying playback speed prediction vector (e.g., the frame slowness predictions from the varying playback speed prediction vector) and the target video duration to determine a video frame sub-sampling for the digital video. In particular, the temporally varying video re-timing system determines a sequence of frame skippings using the varying playback speed prediction vector to satisfy the target video duration. For instance, the temporally varying video re-timing system determines a sequence of frame skippings that minimize an objective loss that is consistent with the per-frame slowness predictions determined from the varying playback speed prediction vector (e.g., utilizing an iterative solver). Indeed, in certain embodiments, the objective loss includes a video duration loss, a minimum video speed loss, a playback speed smoothness loss, and a playback speed prediction loss.

Subsequently, in one or more embodiments, the temporally varying video re-timing system generates a video frame sub-sampling from the sequence of frame skippings. In some embodiments, the video frame sub-sampling includes a duration that is equal to or less than the target video duration. Additionally, in one or more embodiments, the video frame sub-sampling includes frame skips that vary and result in a digital video with varying playback speeds at different segments of the digital video. Indeed, in one or more implementations, the temporally varying video re-timing system utilizes the video frame sub-sampling to generate a modified digital video with temporally varying playback speeds (to fit the target video duration). In some cases, the temporally varying video re-timing system identifies the target video duration to utilize for the re-timing of the digital video utilizing a duration of an audio file (that is being combined to the digital video) or from a social networking platform (e.g., a video duration constraint imposed by a social networking platform).

As mentioned above, conventional digital content modification systems suffer from a number of technical deficiencies. The temporally varying video re-timing system provides a number of advantages relative to these conventional systems. For instance, in contrast to conventional systems that apply uniform playback speeds, the temporally varying video re-timing system accurately determines video sub-samples that satisfy a target video duration while preserving natural video dynamics in the sped-up digital video through localized and temporally varying playback speeds. By utilizing a playback speed prediction machine-learning model, for instance, the temporally varying video re-timing system generates predicted playback speeds specific to frames of a digital video that facilitate adjusting a duration of the digital video with temporally varying playback speeds for such frames.

Additionally, in contrast to a sliding window approach of many conventional systems, the temporally varying video re-timing system utilizes a playback speed prediction machine-learning model that recognizes localized temporally varying changes in video playback speed for specific frames in an input sequence of digital video frames. By using the playback speed prediction machine-learning model to recognize such frame-specific changes, the temporally varying video re-timing system can more accurately detect and process scene content and movement patterns in the scenes to determine accurate localized playback speed predictions. Due to the frame-specific predictions, the temporally varying video re-timing system can maintain performance across lengthy videos. For example, as described in greater detail below, the self-supervised playback speed prediction machine-learning model determines accurate per-frame predictions that indicate improvements in accuracy through reduced prediction errors in comparison to conventional systems that utilize a sliding window approach.

Moreover, unlike conventional digital content modification systems that cannot realistically re-time digital videos with diverse scenes, the video re-time system utilizes the accurate per-frame speed predictions of the playback speed prediction machine-learning model to handle changes in scene content while re-timing a video to fit a target video duration with natural looking results. Due to the accurate per-frame speed predictions of the playback speed prediction machine-learning model, the temporally varying video re-timing system can re-time lengthy digital videos without a substantial degradation of performance. Furthermore, in contrast to conventional systems that cannot control an output video duration, the temporally varying video re-timing system directly selects a sub-sampling of the digital video with verification from the accurate per-frame playback speed predictions to allow direct control over a target video duration. Indeed, in some cases, the temporally varying video re-timing system can re-time digital videos while preserving natural video dynamics with reductions in video lengths much greater than ten percent (e.g., in some cases greater than a thirty percent reduction).

In addition to accuracy and flexibility, the temporally varying video re-timing system can generate a modified digital video that fits a target digital video duration using temporally varying playback speeds at different segments of the digital video with improved efficiency. In particular, unlike the sliding window approach, in one or more embodiments, the temporally varying video re-timing system utilizes the playback speed prediction machine-learning model once (rather than twice, thrice, or more) per digital video to infer the per-frame playback speed predictions. Accordingly, in many implementations, the temporally varying video re-timing system reduces the number of computationally expensive applications of a prediction network for a digital video while also accurately and flexibly determining localized temporally varying changes in video playback speeds to re-time a digital video with varying frame-change speeds.

As suggest by the foregoing discussion, this disclosure utilizes a variety of terms to describe features and benefits of the temporally varying video re-timing system. Additional detail is hereafter provided regarding the meaning of these terms as used in this disclosure. For example, as used herein, the term "digital video" refers to a series of digital visual images that together depict one or more moving scenes (e.g., a series of digital images that, when rendered in sequence, portray a scene having motion). To illustrate, in one or more implementations, a digital video includes, but is not limited to, a digital video file with the following file extensions: FLV, SWF, AVI, WMV, MOV, QT, MKV, MP4, or AVCHD.

Furthermore, as used herein, the term "frame" (sometimes referred to as "video frame" or "digital video frame") refers to a digital visual image of a single portion or instance from a digital video. In particular, in some cases, a frame includes a still image representing a segmnt (or instance) of a video.

Additionally, as used herein, the term "video duration" refers to a length of a digital video represented using an amount of time or a number of frames. As an example, a digital video duration can include a length defined in a number of frames (e.g., 1000 frames, 500 frames, 5000 frames) or an amount of time (e.g., 1 minute, 2 minutes, 20 minutes, 2 hours). In addition, as used herein, the term "target video duration" refers to a goal, required, or threshold length of a digital video. For instance, if a target video duration is 60 seconds, in some embodiments, the temporally varying video re-timing system re-times a digital video with a video source length of 90 seconds to fit within the target video duration of 60 seconds.

Moreover, as used herein, the term "playback speed prediction machine-learning model" refers to a machine-learning model (e.g., a neural network) that determines playback speed classifications for frames of a digital video. In particular, in some instances, a playback speed prediction machine-learning model includes a machine-learning model that generates varying predicted playback speeds for frames of a digital video (e.g., via varying playback speed prediction vector). In some cases, the playback speed prediction machine-learning model includes a neural network (e.g., a three-dimensional convolutional neural network) modified to classify playback speeds of frames of a digital video by detecting a likelihood of observing changes in playback speed between frames of a digital video (e.g., detecting whether a frame appears slower or faster than a default playback speed of the digital video).

Furthermore, as used herein, the term "neural network" refers to a machine-learning model that is trained and/or tuned based on inputs to determine classifications or approximate unknown functions. For example, a neural network includes a model of interconnected artificial neurons (e.g., organized in layers) that communicate and learn to approximate complex functions and generate outputs (e.g., playback speed classifications and/or playback speed probabilities) based on a plurality of inputs provided to the neural network. In some cases, a neural network refers to an algorithm (or set of algorithms) that implements deep learning techniques to model high-level abstractions in data. For example, a neural network includes a convolutional neural network (CNN) and/or a recurrent neural network (RNN).

In addition, as used herein, the term "varying predicted playback speed" refers to a playback speed of one or more frames of a digital video (which can vary per frame). In particular, a varying predicted playback speed can be represented by varying speed classifications for frames of a digital video that are based on likelihoods of observing changes in playback speed between the frames of the digital video. For example, a varying predicted playback speed indicates a probability (or a classification) of a playback speed in between frames of a digital video being at a 1×speed, a 2× speed, and/or a 4× speed.

As further used herein, the term "varying playback speed prediction vector" refers to a vector (or matrix) that represents the varying predicted playback speeds of one or more frames of the digital video. In some cases, the temporally varying video re-timing system utilizes the playback speed prediction machine-learning model to generate a varying playback speed prediction vector to represent the varying predicted playback speeds of one or more frames of the digital video. In particular, in some cases, a varying playback speed prediction vector includes varying speed classifications for frames of a digital video that are based on likelihoods of observing changes in playback speed between the frames of the digital video by indicating, for each frame, whether a frame belongs to a particular playback speed classification from multiple playback speed classifications.

For instance, the varying playback speed prediction vector includes an indication (e.g., via a flag setting or binary toggle) of which playback speed classification that a particular frame is inferred to experience via the playback speed prediction machine-learning model. In some instances, the temporally varying video re-timing system generates a varying playback speed prediction vector by interpolating initial playback speed predictions of an initial varying playback speed prediction vector of a sped-up version of a digital video from a playback speed prediction machine-learning model to a normal varying playback speed prediction vector having normal varying speed classifications for a normal version of the digital video of a source duration.

In some cases, the varying playback speed prediction vector includes a playback speed classification that indicates a likelihood of observing a change in playback speed between frames. To determine a likelihood of observing a change in the playback speed between frames, in one or more embodiments, the temporally varying video re-timing system translates playback speed classifications and classification probabilities from the varying playback speed prediction vector into frame slowness predictions.

As used herein, the term "slowness prediction" (or sometimes referred to as frame slowness prediction) refers to a varying predicted playback speed probability (or classification) that infers the likelihood of a playback speed of a frame being slower than the default playback speed of a sped-up version of the digital video. In some cases, the temporally varying video re-timing system determines a frame slowness prediction to represent a likelihood (or a classification based on a probability) of a frame utilizing a certain playback speed increase while observing minimal change in the frame after the increase in playback speed. For instance, a frame slowness prediction indicates a likelihood of observing minimal change in between frames (or a grouping of frames) when the frames are sped-up. Indeed, in some cases, the frame slowness prediction to indicate a likelihood of frames receiving an increase in playback speed.

In some cases, the temporally varying video re-timing system utilizes a sped-up version of a digital video (e.g., a playback speed of 4×) with a playback speed prediction machine-learning model to identify playback speed predictions (as playback speed classifications within a playback speed prediction vector) in the sped-up video. Moreover, in certain implementations, the temporally varying video re-timing system utilizes the playback speed predictions to determine where frames appear slower than the introduced playback speed (e.g., a playback speed of 4×) of the sped-up version of the digital video as frame slowness predictions. For instance, in the example above, if the playback speed prediction indicates a high probability for a playback speed classification of 2× at a particular frame, the temporally varying video re-timing system infers that the frame is 2× slower than the introduced playback speed of 4× (as the frame slowness prediction) and, therefore, this frame can be sped-up by 2× during re-timing of the source digital video.

Likewise, in the example above, if the playback speed prediction indicates a high probability for a playback speed classification of 1× at a particular frame, the temporally varying video re-timing system infers that the frame is 4× slower than the introduced playback speed of 4× (as the frame slowness prediction) and, therefore, this frame can be sped-up by 4× during re-timing of the source digital video. Additionally, in the example above, if the playback speed prediction indicates a high probability for a playback speed classification of 4× at a particular frame, the temporally varying video re-timing system infers that the frame is not slower than the introduced playback speed of 4× (as the frame slowness prediction) and, therefore, this frame should remain at a 1× speed during re-timing of the source digital video.

Turning now to the figures, FIG. 1 illustrates a schematic diagram of one or more implementations of a system 100 (or environment) in which a temporally varying video re-timing system operates in accordance with one or more implementations. As illustrated in FIG. 1, the system 100 includes server device(s) 102, a network 108, a client device 110, and third-party server device(s) 116. As further illustrated in FIG. 1, the server device(s) 102, the client device 110, and the third-party server device(s) 116 communicate via the network 108.

Indeed, the server device(s) 102 includes, but is not limited to, a computing (or computer) device (as explained below with reference to FIG. 11). As shown in FIG. 1, the server device(s) 102 include a digital graphics system 104 which further includes the temporally varying video re-timing system 106. The digital graphics system 104 can generate, edit, store, retrieve, and/or modify digital graphics, such as digital videos and other digital content.

Moreover, as explained below, the temporally varying video re-timing system 106, in one or more embodiments, generates a temporally remapped video that satisfies a desired target duration while preserving natural video dynamics. In some implementations, the temporally varying video re-timing system 106 utilizes a playback speed prediction machine-learning model to recognize and localize temporally varying changes in video playback speed as varying predicted playback speeds of individual video frames (e.g., frame slowness predictions). Subsequently, in one or more embodiments, the temporally varying video re-timing system 106 determines a video frame sub-sampling that is consistent with the varying predicted playback speeds and a target video duration to generate a modified digital video that includes temporally varying playback speeds at different segments of the digital video to satisfy the target video duration.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 11. In certain implementations, although not shown in FIG. 1, the client device 110 is operated by a user to perform a variety of functions (e.g., via the digital graphics applications 112). For example, the client device 110 performs functions such as, but not limited to, capturing digital videos, editing digital videos, playing digital videos, and/or requesting re-timings of digital videos.

To access the functionalities of the temporally varying video re-timing system 106 (as described above), in one or more implementations, a user interacts with the digital graphics application 112 on the client device 110. For instance, the digital graphics application 112 includes one or more software applications installed on the client device 110 (e.g., to capture, play, and/or modify digital videos in accordance with one or more implementations herein). In some instances, the digital graphics application 112 is hosted on the server device(s) 102. In addition, when hosted on the server device(s), the digital graphics application 112 is accessed by the client device 110 through a web browser and/or another online interfacing platform and/or tool.

Although FIG. 1 illustrates the temporally varying video re-timing system 106 being implemented by a particular component and/or device within the system 100 (e.g., the server device(s) 102), in some implementations, the temporally varying video re-timing system 106 is implemented, in whole or part, by other computing devices and/or components in the system 100. For instance, in some implementations, the temporally varying video re-timing system 106 is implemented on the client device 110 within the digital graphics application 112. In particular, in one or more implementations, the description of (and acts performed by) the temporally varying video re-timing system 106 are implemented (or performed by) the client temporally varying video re-timing system 114 when the client device 110 implements the temporally varying video re-timing system 106. More specifically, in certain instances, the client device 110 (via an implementation of the temporally varying video re-timing system 106 on the client temporally varying video re-timing system 114) re-times a digital video to fit a target digital video duration using temporally varying playback speeds in accordance with one or more implementations.

In some implementations, both the server device(s) 102 and the client device 110 implement various components of the temporally varying video re-timing system 106. For instance, in some embodiments, the server device(s) 102 train the playback speed prediction machine-learning model and provide the playback speed prediction machine-learning model to the client device 110 to implement/apply the playback speed prediction machine-learning model on the client device 110. Subsequently, for example, the client device 110 (via the client temporally varying video re-timing system 114) utilizes the trained playback speed prediction machine-learning model determine varying predicted playback speeds to generate a temporally remapped video that satisfies a desired target duration while preserving natural video dynamics (in accordance with one or more implementations).

As further shown in FIG. 1, the system 100 includes the third-party server device(s) 116. For example, the third-party server device(s) can include one or more server devices for various digital video based services. For example, the third-party server device(s) implement a variety of third-party services, such as, but not limited to video streaming services, social media services, and/or cloud storage services. In addition, the third-party server device(s) includes, but is not limited to, a computing (or computer) device (as explained below with reference to FIG. 11).

In many cases, the third-party services receive uploads of digital videos for utilization as content (and/or for storage) and impose video length restrictions on the uploads (e.g., a digital video is required to be less than 2 minutes, 3 minutes). In one or more implementations, the client device 110 provides a digital video and a target video duration (as identified from a service of the third-party server device(s)) to the temporally varying video re-timing system to re-time the digital video using temporally varying playback speed to satisfy the target video duration. Subsequently, in some embodiments, the client device 110 utilizes the re-timed digital video with the services implemented on the third-party server device(s) 116. In some cases, one or more of the above mentioned services are implemented on the server device(s) 102 in relation to the digital graphics system 104.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 11. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
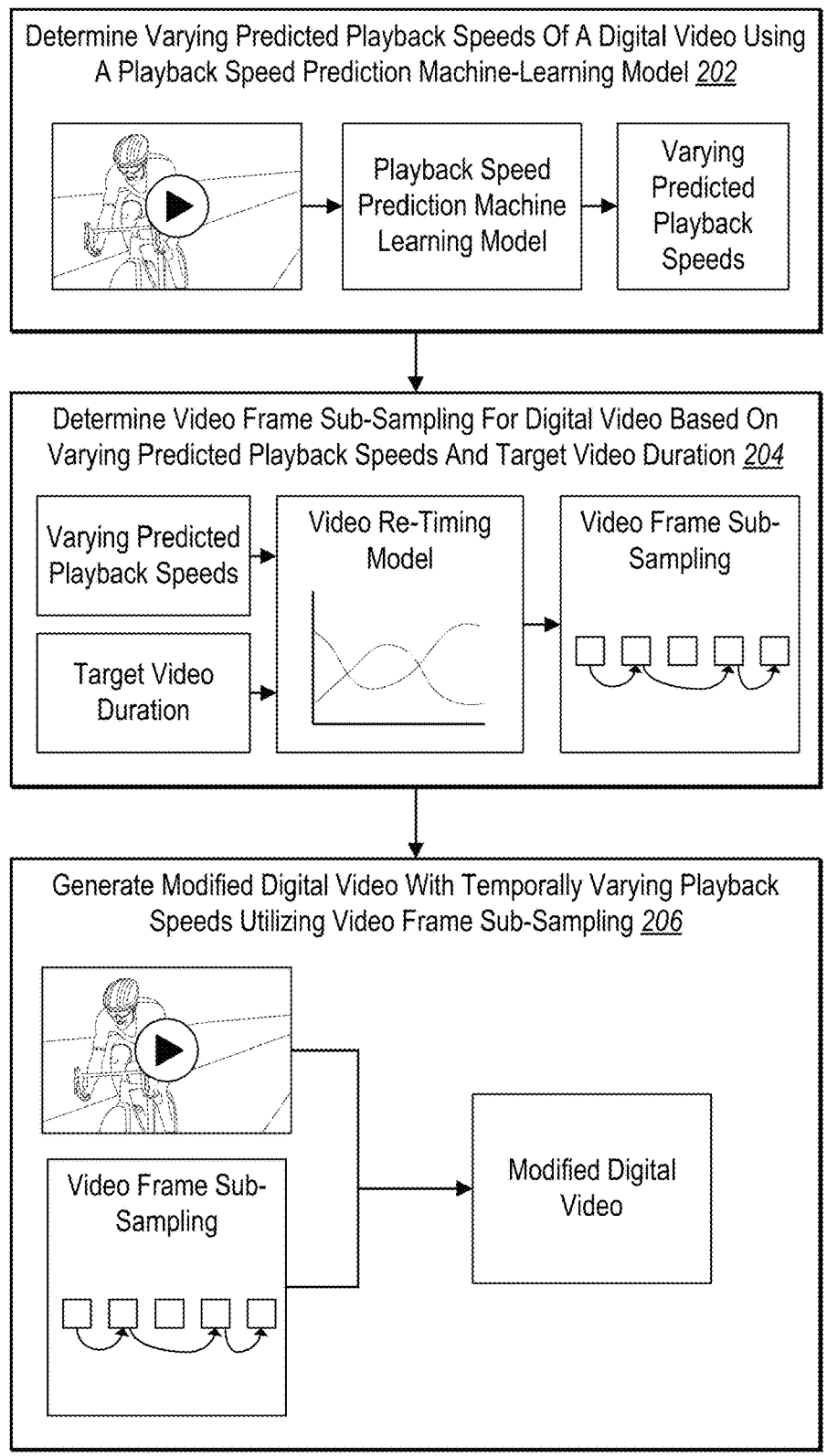
FIG. 2 illustrates an overview of a temporally varying video re-timing system generating a speed varying digital video that satisfies a target video duration in accordance with one or more implementations.

As previously mentioned, in one or more implementations, the temporally varying video re-timing system 106 generates a modified digital video that fits a target digital video duration using temporally varying playback speeds at different segments of the digital video from a playback speed prediction machine-learning model. For example, FIG. 2 illustrates an overview of the temporally varying video re-timing system 106 generating a speed varying digital video (from a digital video) that satisfies a target video duration while preserving natural video dynamics via different playback speeds at different segments of the digital video. As shown in FIG. 2, the temporally varying video re-timing system 106 first determines varying predicted playback speeds of a digital video using a playback speed prediction machine-learning model. Additionally, as illustrated in FIG. 2, the temporally varying video re-timing system 106 determines a video frame sub-sampling for the digital video using the varying predicted playback speeds and a target video duration and utilizes the video frame sub-sampling to generate a modified digital video that fits the target video duration.

As shown in act 202 of FIG. 2, the temporally varying video re-timing system 106 determines varying predicted playback speeds of a digital video using a playback speed prediction machine-learning model. In particular, in one or more embodiments, the temporally varying video re-timing system 106 utilizes a playback speed prediction machine-learning model that is trained using self-supervision with randomly sampled digital videos. Indeed, in certain instances, the temporally varying video re-timing system 106 utilizes the playback speed prediction machine-learning model with a sped-up version of a digital video to determine a varying playback speed prediction vector that includes varying speed classifications for frames of the digital video based on likelihoods of observing changes in playback speed between the frames of the digital video (e.g., as frame slowness predictions). Additional detail regarding training the playback speed prediction machine-learning model and generating a varying playback speed prediction vector for a digital video during implementation (for per-frame slowness predictions) is described below (e.g., in reference to FIGS. 3 and 4).

As further shown in act 204 of FIG. 2, the temporally varying video re-timing system 106 determines video frame sub-sampling for the digital video based on the varying predicted playback speeds and a target video duration. In particular, as shown in the act 204, the temporally varying video re-timing system 106 utilizes the varying predicted playback speeds (e.g., from a varying playback speed prediction vector translating to frame slowness predictions) and an identified target video duration with a video re-timing model that determines a video frame sub-sampling for the digital video that is consistent with the slowness predictions from the varying playback speed prediction vector while also fitting the target video duration. Additional detail regarding determining a video frame sub-sampling from varying predicted playback speeds and a target video duration is described below (e.g., in reference to FIG. 5).

Lastly, as shown in act 206 of FIG. 2, the temporally varying video re-timing system 106 generates a modified digital video with temporally varying playback speed utilizing the video frame sub-sampling. For instance, the temporally varying video re-timing system 106 utilizes the video frame sub-sampling, which indicates an index of frames to include in a target digital video, to select frames from original digital video to generate the modified digital video. Indeed, in one or more embodiments, the modified digital video includes temporally varying playback speeds (i.e., different numbers of frame skips) at different segments of the digital video to satisfy the target video duration. Additional detail regarding generating the speed varying digital video from a digital video to fit a target video duration is described below (e.g., in reference to FIGS. 6-8).

Figure 3:
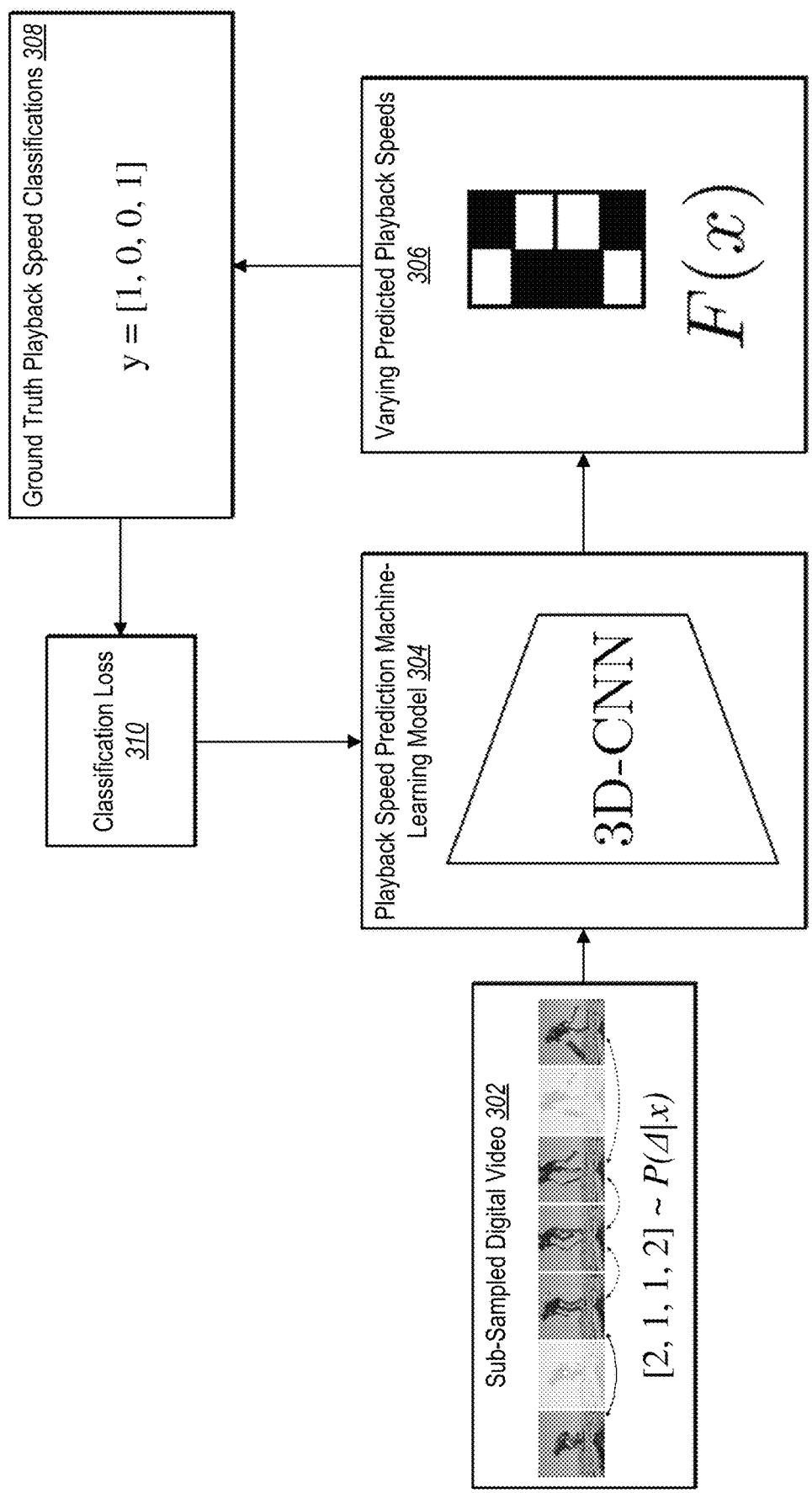
FIG. 3 illustrates a temporally varying video re-timing system training a playback speed prediction machine-learning model in accordance with one or more implementations.

As mentioned above, in one or more embodiments, the temporally varying video re-timing system 106 trains a playback speed prediction machine-learning model utilizing a self-supervised learning approach with sample sequences of frame skippings from digital videos (as training data). For example, FIG. 3 illustrates the temporally varying video re-timing system 106 training a playback speed prediction machine-learning model. As shown in FIG. 3, the temporally varying video re-timing system 106 utilizes a sample sequence of frame skippings of a digital video with a playback speed prediction machine-learning model and generates a classification loss for training of the playback speed prediction machine-learning model by utilizing the sequence of frame skippings of the digital video as ground truth data for the predicted playback speeds.

As illustrated in FIG. 3, the temporally varying video re-timing system 106 generates a sub-sampled digital video 302 by sampling a sequence of frame skippings for a training digital video. Subsequently, as further shown in FIG. 3, the temporally varying video re-timing system 106 utilizes the sub-sampled digital video 302 with the playback speed prediction machine-learning model 304 to determine varying predicted playback speeds 306 as playback speed classifications for the sub-sampled digital video 302. Indeed, in some cases and as shown in FIG. 3, the temporally varying video re-timing system 106 utilizes the playback speed prediction machine-learning model 304 (e.g., a neural network F) to generate a playback speed prediction vector (or matrix) (e.g., a output F(x) for the sub-sampled digital video x) that classifies a playback speed per frame (e.g., the first frame transition represented in the first row of the vector is classified to a 2× playback speed or a single frame skip, the second frame transition represented in the second row of the vector is classified to a 1× playback speed or no frame skip, and so forth).

Moreover, as shown in FIG. 3, upon determining the varying predicted playback speeds 306, the temporally varying video re-timing system 106 compares the predicted playback speed classifications from the varying predicted playback speeds 306 to ground truth playback speed classifications 308 that correspond to the frame skips from the sub-sampled digital video 302. Indeed, as illustrated in FIG. 3, the temporally varying video re-timing system 106 generates a classification loss 310 from the comparison of the ground truth playback speed classifications 308 and the predicted playback speed classifications from the varying predicted playback speeds 306.

Additionally, as shown in FIG. 3, the temporally varying video re-timing system 106 utilizes the classification loss 310 with the playback speed prediction machine-learning model 304 to train the playback speed prediction machine-learning model 304. In particular, in one or more embodiments, the temporally varying video re-timing system 106 utilizes a training objective that learns parameters of the playback speed prediction machine-learning model 304 to minimize the classification loss 310. Indeed, the temporally varying video re-timing system 106 iteratively generates varying predicted playback speeds 306 for the sub-sampled digital video 302 using the playback speed prediction machine-learning model 304 to determine a classification loss 310 to iteratively train the playback speed prediction machine-learning model 304.

As mentioned above, in some embodiments, the temporally varying video re-timing system 106 generates sample sequences of frame skippings from digital videos (as training data). Indeed, in one or more implementations, the temporally varying video re-timing system 106 generate various amounts of training data by generating sample sequences of frame skippings from a set of training digital videos. In addition, in one or more embodiments, the temporally varying video re-timing system 106 also generates a sequence of frame skips with target speedup classifications as ground truth data for the training sample sequences of frame skippings from the set of training digital videos. In some cases, the temporally varying video re-timing system 106 generates a sample sequence of random frame skippings from a digital video as training data.

To illustrate, in some cases, the temporally varying video re-timing system 106 identifies a training video $x_i=[x_1, \ldots, x_{n_i}]$ having $n_i$ frames. Subsequently, in some embodiments, to generate a training sample sequence of frame skippings from the training video $x_i$, the temporally varying video re-timing system 106 samples a sequence of frame skips $\Delta=[\delta_1, \ldots, \delta_m]$ utilizing a (random) procedure $\Delta \sim P(\Delta|x_i)$. Additionally, in one or more embodiments, the frame skips $\delta_i$ belong within a set of a k number of speedup classes as defined by the following function:

$$\delta_i \in \{2^k\}_{j=0}^k \qquad (1)$$

Subsequently, in one or more embodiments, to generate the training sample sequence of frame skippings, the temporally varying video re-timing system 106 first samples Y~U ([0,0.4]) which defines probability of observing a change in playback speed. In some implementations, the sample Y can include a selection of a probability from various ranges of probability. Subsequently, to obtain a sequence of frame skippings Δ from the training video $x_i$, the temporally varying video re-timing system 106 models $P(\Delta|x_i, \sigma)$ as a Markov chain with transition probabilities in accordance with the following function:

$$P(\delta_{i+1} | \delta_i, \sigma) = \begin{cases} 1-\sigma & \text{if } \delta_{i+1} = \delta_i \\ \frac{\sigma}{k} & \text{otherwise} \end{cases} \qquad (2)$$

Indeed, in one or more embodiments, the temporally varying video re-timing system 106 utilizes the sequence of frame skippings Δ to define temporally varying speedups of a digital video. To generate ground truth playback speed classifications y (e.g., target classes) for the sequence of frame skippings $\Delta=[\delta_1, \ldots, \delta_m]$, the temporally varying video re-timing system 106 determines $y=[\log_2\delta_1, \ldots, \log_2\delta_m]$ from the sequence of frame skippings Δ (e.g., a sequence of frame skippings of 2, 1, 1, and 2 would translate to ground truth playback speed classifications of 1, 0, 0, and 1 in frame order).

To generate the sub-sampled digital video (as training data), the temporally varying video re-timing system 106, in one or more embodiments, translates the sequence of frame skippings $\Delta=[\delta_1, \ldots, \delta_m]$ into frame indices v using the following function:

$$v(x_i | \Delta) = \rho + \left[0, \delta_1, \ldots, \sum_{i=1}^m \delta_m\right] \qquad (3)$$

In some cases, the temporally varying video re-timing system 106 utilizes a random offset $$\rho \sim \mathcal{U}\left(\left[0, n_i - \sum_{i=1}^m \delta_m\right]\right)$$

within the function (3). Indeed, the frame indices v, as defined in function (3), indicates an index of frames to utilize from the training video $x_i$ as a sub-sampled digital video for training the playback speed prediction machine-learning model. For example, the temporally varying video re-timing system 106 utilizes the sub-sampling frame indices v (of function (3)) to generate a temporally sampled video $x_i^v$ as the sub-sampled digital video (for training) using the following function:

$$x_i^v = [x_{v_0}, \ldots, x_{v_m}] \qquad (4)$$

In some instances, the temporally varying video re-timing system 106 determines a sub-sampled digital video for training the playback speed prediction machine-learning model via user selection. For instance, the temporally varying video re-timing system 106 receives a user selection of frames to skip from a digital video from an administrator device that is generating training data. Subsequently, in one or more embodiments, the temporally varying video re-timing system 106 utilizes the selected frames to remove the selected frames resulting in a sub-sampled digital video. Indeed, in one or more embodiments, the temporally varying video re-timing system 106 generates various sub-sampled digital videos from a number of digital videos and/or various combinations of sequences of frame skippings.

Furthermore, in one or more embodiments, the temporally varying video re-timing system 106 utilizes a playback speed prediction machine-learning model based on a convolutional neural network to determine varying predicted playback speeds for a sub-sampled digital video (generated as described above). In some cases, the temporally varying video re-timing system 106 utilizes a playback speed prediction machine-learning model F that is constructed such that it preserves the temporal dimension of an input video. In particular, in some cases, the playback speed prediction machine-learning model F preserves the temporal dimension of an input video such that, for an input video $x^v \Im \mathbb{R}^{(m+1)\times h \times w \times c}$, the output of the playback speed prediction machine-learning model F is $F(x^v) \Im \mathbb{R}^{m \times k}$.

Additionally, in one or more embodiments, the temporally varying video re-timing system 106 utilizes a modified three-dimensional convolutional neural network (3D-CNN) backbone architecture as the playback speed prediction machine-learning model F. For instance, the temporally varying video re-timing system 106 sets all temporal strides of the 3D-CNN backbone architecture to 1 and utilizes 'SAME'-padding throughout the network. Furthermore, in some instances, the temporally varying video re-timing system 106 introduces custom network heads tailored to the between-frame speed prediction task. In some implementations, the temporally varying video re-timing system 106 further replaces a global spatio-temporal average pooling with a spatial-only global average pooling.

Moreover, in some embodiments, the temporally varying video re-timing system 106 includes two layers of one-dimensional (1D)-convolutions after the 3D-CNN backbone architecture. As an example, the temporally varying video re-timing system 106 includes a first layer having a kernel-size of 2 and 'VALID' padding (reducing the temporal dimension to m) and a second layer having a kernel-size of 1. Additionally, in some cases, the temporally varying video re-timing system 106 applies a softmax activation to the network output.

Indeed, in some cases, the playback speed prediction machine-learning model F outputs varying predicted playback speeds in accordance with the following function:

$$F(x^v)[i,j] = p(y_i = j | x^v) \qquad (5)$$

In the function (5), the temporally varying video re-timing system 106 utilizes $y_i$ as playback speed classifications (e.g., such that $2^{u_i}$ indicates a number of skipped frames $\delta_i$ for frame indices i.

Indeed, in some cases, the temporally varying video re-timing system 106 utilizes the above described modifications in a 3D-CNN backbone architecture as described in Tran, A Closer Look at Spatiotemporal Convolutions for Action Recognition, arXiv:1711.11248v3 (2018). In one or more additional embodiments, the temporally varying video re-timing system 106 can modify and utilize various CNN architecture having various configurations as the playback speed prediction machine-learning model F.

Furthermore, in one or more embodiments, the temporally varying video re-timing system 106 utilizes the output varying predicted playback speeds of the playback speed prediction machine-learning model F from an input sub-sampled digital video with ground truth playback speed classifications y corresponding to the input sub-sampled digital video (as described above) to generate a classification loss. In some cases, the temporally varying video re-timing system 106 utilizes a weighted cross-entropy classification loss that produces an increasing loss as a predicted playback speed classification from the playback speed prediction machine-learning model F diverges from the ground truth playback speed classifications y. To illustrate, in some cases, the temporally varying video re-timing system 106 utilizes a weighted cross-entropy classification loss as defined in the following function:

$$\mathbb{E}_{x_i^y, y_i} \left[ -\sum_{j=1}^{m} \omega_{y_j} \right] \cdot \log F(x_i^y)[j, y_i] \qquad (6)$$

In the above function (6), the temporally varying video re-timing system 106 determines the weighted cross-entropy classification loss by utilizing a binary indicator of whether the classification for an observation (e.g., the predicted observation $F(x_i^y)[j, y_i]$) is correct or incorrect at a frame index of i. Furthermore, in one or more embodiments, the temporally varying video re-timing system 106 utilizes weights $\omega_{y_j}$ such that lower speed classes have a higher weight. Indeed, in one or more embodiments, the temporally varying video re-timing system 106 utilizes the weights $\omega_{y_j}$ to bias the playback speed prediction machine-learning model F towards predicting lower playback speeds (e.g., in ambiguous cases or where plausible). In some cases, the temporally varying video re-timing system 106 sets the weights $\omega_{y_j}$ to $1.25^{(k-y)}$. Although one or more embodiments describe the temporally varying video re-timing system 106 utilizing a weighted cross-entropy classification loss to train the playback speed prediction machine-learning model F, the temporally varying video re-timing system 106 can utilize a variety of loss functions, such as, but not limited to, hinge loss, binary classification loss, and/or multi-class classification loss function.

Furthermore, in one or more embodiments, the temporally varying video re-timing system 106 utilizes an Adam optimizer (e.g., an AdamW optimizer or other iterative solver) to learn parameters of the playback speed prediction machine-learning model. In some cases, the temporally varying video re-timing system 106 further utilizes a learning rate that is decayed based on a cosine annealing schedule. Additionally, the temporally varying video re-timing system 106 further utilizes one or more data-augmentations, such as horizontal flipping, color-jittering, and/or random cropping while learning parameters of the playback speed prediction machine-learning model.

Figure 4:
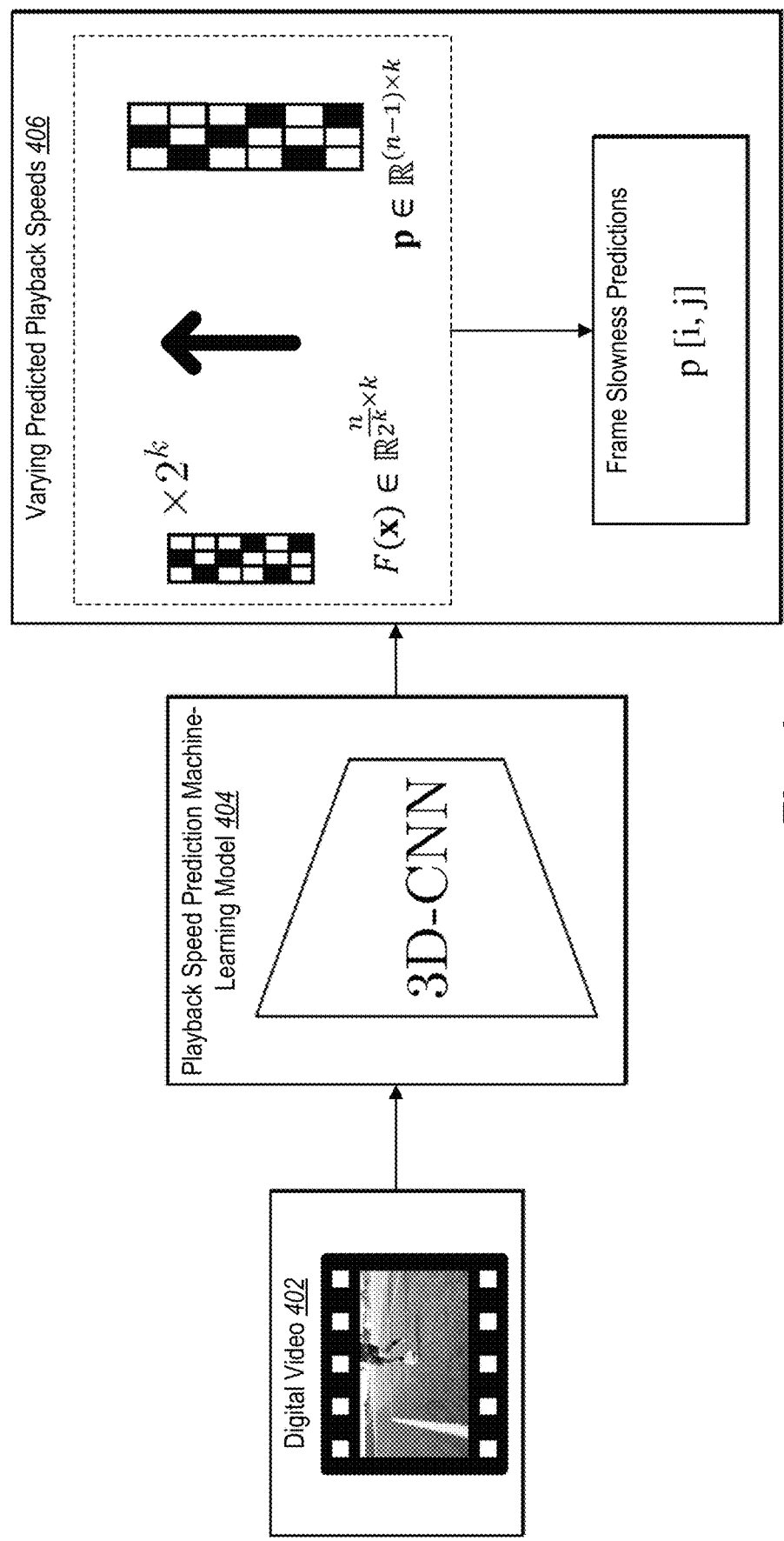
FIG. 4 illustrates a temporally varying video re-timing system determining varying predicted playback speeds from a digital video in accordance with one or more implementations.

As mentioned above, in one or more embodiments, the temporally varying video re-timing system 106 utilizes a playback speed prediction machine-learning model to determine varying predicted playback speeds of a digital video. For example, FIG. 4 illustrates the temporally varying video re-timing system 106 determining varying predicted playback speeds from a digital video. As shown in FIG. 4, the temporally varying video re-timing system 106 provides the digital video 402 to the playback speed prediction machine-learning model 404 (trained using a self-supervised approach as described above). Subsequently, as shown in FIG. 4, the playback speed prediction machine-learning model 404 outputs varying predicted playback speeds 406 for frames of the digital video 402.

As shown in FIG. 4, the temporally varying video re-timing system 106 utilizes the playback speed prediction machine-learning model 404 to analyze the input digital video 402 at $2^k$ the normal speed (e.g., a maximum playback speed from the playback speed classes k) of the digital video 402 to determine the varying predicted playback speeds 406. Indeed, as illustrated in FIG. 4, the playback speed prediction machine-learning model 404 generates a playback speed prediction vector as the output varying predicted playback speeds 406 to indicate playback speed classifications for the sped-up version of the digital video 402 (e.g., $$F(x) \in \mathbb{R}^{\frac{n}{2^k} \times k}$$

for $$\frac{n}{2^k}$$

frame transitions and k playback speed classes). In reference to FIG. 4, the playback speed prediction vector (e.g., from the varying predicted playback speeds 406) includes a row for each in-between frame of the sped-up version of the digital and columns to indicate playback speed classifications that indicate an amount the frame is predicted to have been sped up. For example, FIG. 4 illustrates a sped-up version of the digital video 402 with a maximum playback speed of 4× using 3 playback speed classes (e.g., k=3) defined as 0, 1, and 2 for 1×, 2×, and 4×.

Furthermore, as shown in FIG. 4, the playback speed prediction vector (e.g., from the varying predicted playback speeds 406) indicates that in the first frame transition (e.g., the first row) of the sped-up version of the digital video, the playback speed prediction machine-learning model 404 determined that a 2× playback speed is likely observed (e.g., a higher probability for the second column in the first row). Furthermore, as illustrated in FIG. 4, the playback speed prediction vector indicates that in the second frame transition (e.g., the second row), the playback speed prediction machine-learning model 404 determines that a 1× playback speed is likely observed. Moreover, as shown in FIG. 4, the playback speed prediction vector indicates that in the fourth frame transition (e.g., the fourth row), the playback speed prediction machine-learning model 404 determines that a 4× playback speed is likely observed.

Additionally, as shown in FIG. 4, the temporally varying video re-timing system 106 further determines the varying predicted playback speeds 406 (of the sped-up version of the digital video 402) by interpolating the initial playback speed prediction vector to a source video duration of the digital video 402. In particular, as shown in FIG. 4, the initial playback speed prediction vector is linearly interpolated such that the initial playback speed prediction vector that includes initial varying speed classifications for the sped-up version of the digital video (e.g., having a sped-up video duration) is translated to a normal varying playback speed prediction vector that includes varying speed classifications for a sped-up version of the digital video with frames of a source video duration.

In other words, the varying speed classifications determined for the frames of the sped-up version of the digital video are interpolated to fit frames of a source video duration. In particular, in one or more embodiments, the temporally varying video re-timing system 106 determines, through interpolation, varying speed classification predictions for the frames of the normal version of the digital video while assuming the frames are sped-up utilizing the playback speed $2^k$. As shown in FIG. 4, the output, initial playback speed prediction vector $$\left(\text{e.g.,}\ F_{2^k}(x) \in \mathbb{R}^{\frac{n}{2^k} \times k}\right.$$

from a playback speed prediction machine-learning model with input videos sped-up by $2^k$) is interpolated to generate the normal playback speed prediction vector (e.g., p∈ $\mathbb{R}^{(n-1) \times k}$) such that the playback speed classifications of the sped-up video fit a source duration for frames of the normal version of the digital video 402.

Moreover, as shown in FIG. 4, the temporally varying video re-timing system 106 further utilizes the interpolated playback speed prediction vector to determine per-frame slowness predictions for frames of the normal version of the digital video 402. Indeed, in one or more embodiments, the temporally varying video re-timing system 106 translates the interpolated playback speed prediction factor to per-frame slowness predictions p[i, j]. Indeed, as described in greater detail below, in some implementations, the temporally varying video re-timing system 106 utilizes the per-frame slowness predictions (as the varying predicted playback speeds 406) to indicate a likelihood of a frame appearing slow when sped-up. In some cases, the temporally varying video re-timing system 106 utilizes the per-frame slowness predictions to determine the amount a frame can be sped-up with a likelihood of not observing changes in the transition of the frame to a subsequent frame (or from a previous frame).

In some cases, the temporally varying video re-timing system 106 modifies a trained playback speed prediction machine-learning model to receive input digital videos as sped-up versions of the input digital videos. For example, in some cases, the temporally varying video re-timing system 106 feeds a digital video at a speed $2^k$ into the trained playback speed prediction machine-learning model. In order to feed the digital video at the speed $2^k$, the temporally varying video re-timing system 106 modifies the playback speed prediction machine-learning model to convert the digital video into a sped-up version of the digital video (e.g., by a playback speed of $2^k$). As an example, the temporally varying video re-timing system 106 prepends a temporal subsampling layer with stride $2^k$ to the playback speed prediction machine-learning model to feed the digital video at the speed $2^k$.

As mentioned above, in reference to FIG. 4, the playback speed prediction machine-learning model that is modified to analyze a sped-up version of the digital video (e.g., $F_{2^k}(x)$) for a digital video x. In one or more embodiments, the playback speed prediction machine-learning model $F_{2^k}(x)$ outputs a playback speed prediction vector that indicates playback speed classifications that represent a detected playback speed at particular frames of a sped-up version of a digital video as described in the following function:

$$F_{2^k}(x) \in \mathbb{R}^{\frac{n}{2^k} \times k} \quad (7)$$

In the function (7), the playback speed prediction vector indicates playback speed classifications for an $$\frac{n}{2^k}$$

number of frame transitions of the sped-up version of the digital video from a k number of playback speed classes.

Furthermore, as previously mentioned, the temporally varying video re-timing system 106 interpolates the initial playback speed prediction vector corresponding to the sped-up version of the digital video to a normal playback speed prediction vector to fit the playback speed classifications of the initial playback speed prediction vector to frames of a normal version of digital video of a source duration. In one or more instances, the temporally varying video re-timing system 106 linearly interpolates the initial playback speed prediction vector to a source duration utilizing a number of frames of the normal version of the digital video by fitting the playback speed classifications from the duration of the sped-up version of the digital video (e.g., a number of frames in the sped-up version) to a source duration of the normal version of the digital video (e.g., a number of frames of the normal version). For instance, the temporally varying video re-timing system 106 linearly interpolates the initial playback speed prediction vector from function (7) to a length n−1 to get between-frame speed classifications (or likelihoods) p (e.g., an interpolated playback speed prediction vector for frames of anormal version of the digital video( in accordance with the following function:

$$p = \mathbb{R}^{(n-1) \times k} \quad (8)$$

As also mentioned above, the temporally varying video re-timing system 106 utilizes the varying playback speed prediction vector to determine the likelihood of slowness per frame of the digital video as the likelihoods of observing changes in playback speed between frames of a sped-up version of the digital video. In one or more implementations, the likelihood of observing changes in the playback speed is indicated by observing that a frame transition is slower than the default speed of a sped-up version of the digital video. Accordingly, in one or more embodiments, the temporally varying video re-timing system 106 utilizes a varying playback speed prediction vector that includes varying speed classifications for the sped-up version of the digital video to determine frame slowness predictions for frames of a normal version of the digital video.

As an example, in reference to FIG. 4, upon determining the playback speed prediction vector (e.g., as part of the varying predicted playback speeds 406), the temporally varying video re-timing system 106 utilizes the playback speed classification of 2× in the first frame transition (indicated by the first row) to determine that the first frame transition is 2× slower than the default playback speed of the sped-up version of the digital video. In addition, the temporally varying video re-timing system 106 utilizes the playback speed classification of 1× at the second frame transition (indicated by the second row) to determine that the second frame transition is 4× slower than the default playback speed of the sped-up version of the digital video. Moreover, the temporally varying video re-timing system 106 utilizes the playback speed classification of 4× in the fourth frame transition (indicated by the fourth row) to determine that the fourth frame transition is not slower than the default playback speed of the sped-up version of the digital video.

In particular, upon utilizing interpolation to generate a playback speed prediction vector for frames of a normal version of the digital video (p from function (8)), the temporally varying video re-timing system 106 utilizes the playback speed prediction vector to generate frame slowness predictions per frame for the normal version of the digital video. For instance, the temporally varying video re-timing system 106 determines a slowness prediction p[i, j] per frame i that indicates the probability of the frame appearing slow from playback speed classes j and corresponding playback speed predictions p for the playback speed classes j (from the playback speed prediction vector for a normal version of the digital video) in accordance with the following function:

$$p[i, j] = p\left(\delta_i = \frac{1}{2^{k-j}}\right) \quad (9)$$

In the function (9) above, the temporally varying video re-timing system 106 assigns a frame slowness probability per frame by determining for different predicted playback speed classifications j the probability of the frame i appearing slow based on the classification probabilities assigned to the playback speed classes j of the sped-up version of the digital video (using the interpolated playback speed prediction vector from the sped-up version of the digital video).

In some cases and as an alternate, the playback speed prediction machine-learning model analyzes a sped-up version of a digital video to observe visual differences between frames to determine a frame slowness prediction. In particular, in one or more embodiments, the playback speed prediction machine-learning model determines a greater frame slowness prediction for a varying playback speed classification when a frame is determined to have minimal visual change between the frame and neighboring frames (e.g., previous and subsequent frames). For example, the playback speed prediction machine-learning model is determining slowness predictions for frames of a sped-up version of the digital video to identify frames that can be sped-up in a normal version of the digital video because visual changes at those frames corresponded to a high likelihood of not being noticeable in the sped-up version of the digital video.

For instance, in some cases, the playback speed prediction machine-learning model measures the visual different between a frame and neighboring frames by comparing latent features of the frames for similarities or differences (e.g., utilizing a cosine similarity, Euclidean distance). Indeed, in some cases, when the visual difference measurement between the frame and neighboring frames is above a noticeable visual difference threshold, the playback speed prediction machine-learning model determines a high probability for a playback speed classification that indicates that the frame is not slowed down (e.g., increasing the playback speed of the sped-up digital video at the frame is likely to be noticeable). Likewise, in one or more embodiments, when the visual difference measurement between the frame and neighboring frames does not meet a noticeable visual difference threshold, the playback speed prediction machine-learning model determines a high probability for a playback speed classification that indicates that the frame is slowed down (e.g., increasing the playback speed of the sped-up digital video at the frame is likely to not be noticeable).

Figure 5:
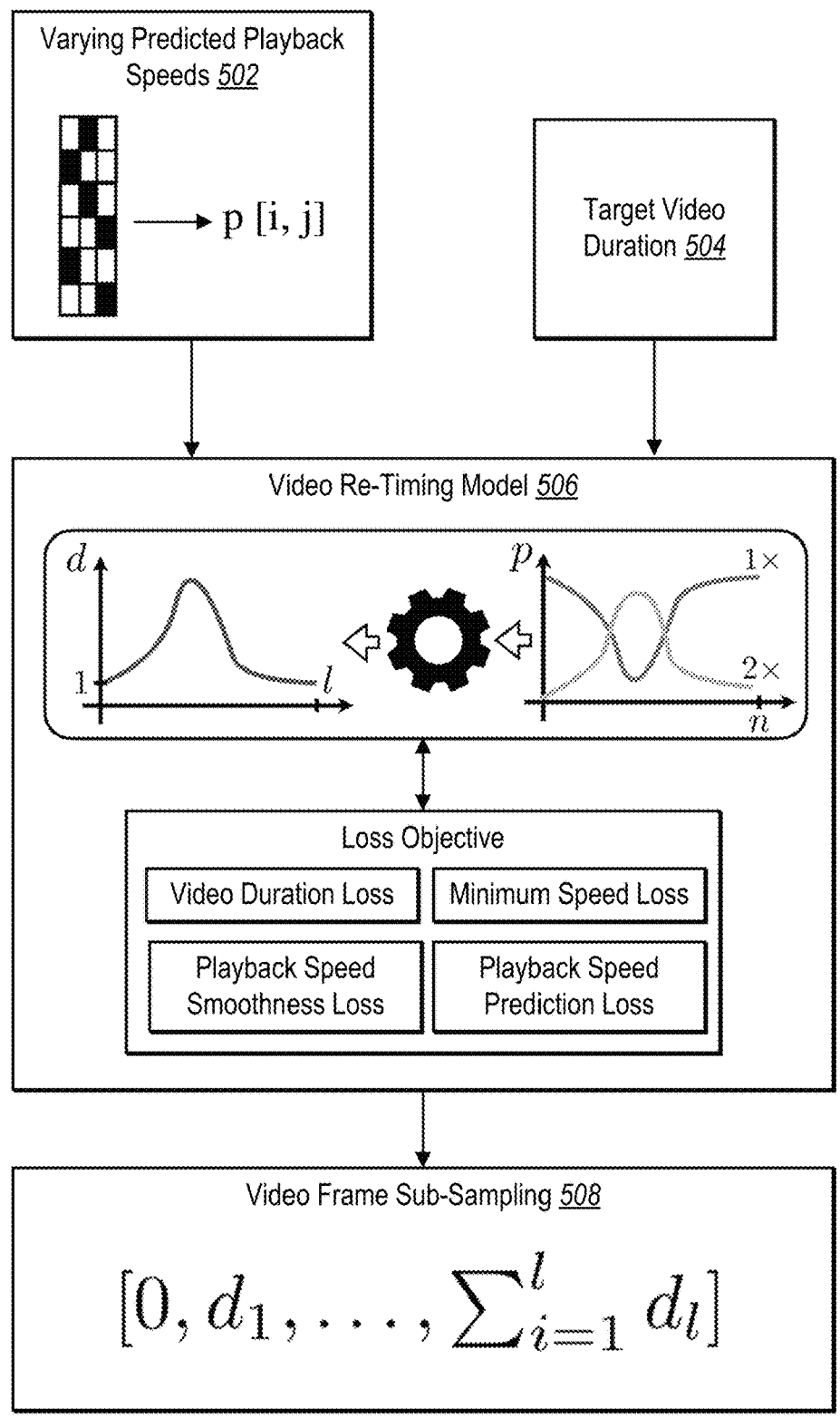
FIG. 5 illustrates a temporally varying video re-timing system determining a video frame sub-sampling from frames of the digital video using predicted playback speeds and a target video duration in accordance with one or more implementations.

As mentioned above, the temporally varying video re-timing system 106 determines a video frame sub-sampling for a digital video utilizing varying predicted playback speeds from the playback speed prediction machine-learning model and a target video duration. For example, FIG. 5 illustrates the temporally varying video re-timing system 106 determining a video frame sub-sampling from the frames of the digital video. As an overview, FIG. 5 illustrates the temporally varying video re-timing system 106 utilizing varying predicted playback speeds that indicate frame slowness predictions for a digital video and a target video duration to determine a video frame sub-sampling that is consistent with the frame slowness predictions and fit the target video duration.

For example, as shown in FIG. 5, the temporally varying video re-timing system 106 utilizes varying predicted playback speeds 502 of a digital video. In one or more instances, the temporally varying video re-timing system 106 utilizes a predicted playback speed vector generated for the digital video using a playback speed prediction machine-learning model and corresponding frame slowness predictions (p [i, j]) from the predicted playback speed vector as described above. Indeed, the temporally varying video re-timing system 106 utilizes the frame slowness predictions to determine and detect frames of an original version of a digital video that appear slow (and are capable of speeding up).

Furthermore, as shown in FIG. 5, the temporally varying video re-timing system 106 utilizes a video re-timing model 506 that utilizes the varying predicted playback speeds 502 (e.g., as slowness predictions p for various playback speeds) to determine a sequence of frame skips d that fit within the target video duration 504 (e.g., l). In particular, as shown in FIG. 5, the temporally varying video re-timing system 106 utilizes a loss objective based partially on playback speed predictions (e.g., the varying predicted playback speeds 502). Indeed, in reference to FIG. 5, the temporally varying video re-timing system 106 determines a sequence of frame skips d that fit within the target video duration 504 while also minimizing the loss objective (e.g., accounting for a video duration loss, minimum speed loss, playback speed smoothness loss, playback speed prediction loss). Indeed, as shown in FIG. 5, the temporally varying video re-timing system 106 utilizes the sequence of frame skips d to determine a video frame sub-sampling 508.

In one or more instances, the temporally varying video re-timing system 106 determines a sequence of frame skippings for a digital video that translate into a video frame sub-sampling that fits a target video duration. For instance, in one or more embodiments, the temporally varying video re-timing system 106 determines a sequence of frame skippings $d=[d_1, \ldots, d_l]$ that indicate the number of frames to skip at each frame transition in a digital video to fit a target video duration l. Moreover, in one or more embodiments, the temporally varying video re-timing system 106 determines a video frame sub-sampling v (as sub-sampling indices) utilizing the sequence of frame skippings d. To illustrate, in one or more embodiments, the temporally varying video re-timing system 106 determines the video frame sub-sampling indices v in accordance with the following function:

$$v = \left[0, d_1, \ldots, \sum_{i=1}^{l} d_i\right] \quad (10)$$

In function (10) above, the temporally varying video re-timing system 106 selects a subset of frames from the frame indices (0 through n) of the digital video to determine the video frame sub-sampling. In particular, in reference to function (10), the temporally varying video re-timing system 106 starts from 0 and utilizes the frame skips $d_i$ to select each subsequent frame index after skipping $d_i$ frames. In one or more embodiments, the resulting video frame sub-sampling v includes an index of non-skipped frames from the digital video. In addition, in one or more embodiments, the temporally varying video re-timing system 106 utilizes the frame skips $d_i$ to select an l number of frames such that the video frame sub-sampling v corresponds to a duration equal to or less than the target video duration l.

As previously mentioned, the temporally varying video re-timing system 106 determines a sequence of frame skippings $d_i$ that is consistent with the varying predicted playback speeds of the digital video. To illustrate, in one or more embodiments, the temporally varying video re-timing system 106 initializes a uniform sub-sampling of the digital video utilizing the number of frames n of the digital video and the target video duration l. For instance, the temporally varying video re-timing system 106 initializes a uniform sub-sampling of the digital video $$d_{init} = \left[\frac{n}{l}, \dots, \frac{n}{l}\right]$$

that skips every $$\frac{n}{l}$$

frames. Moreover, in one or more embodiments, the temporally varying video re-timing system 106 determines the sequence of frame skippings $d_i$ by modifying (e.g., optimizing) the initial sub-sampling (or frame skippings) $d_{init}$ until the sequence of frame skippings $d_i$ is consistent with the varying predicted playback speeds of the digital video and also fit a target video duration.

To illustrate, in some cases, the temporally varying video re-timing system 106 utilizes a loss objective to determine sequence of frame skippings $d_i$ that is consistent with the varying predicted playback speeds of the digital video (e.g., via frame slowness predictions) and also fit a target video duration. For example, as shown in FIG. 5, the temporally varying video re-timing system 106 determines a sequence of frame skippings $d_i$ that fits the target video duration and a loss objective based on varying predicted playback speeds (e.g., via the varying playback speed prediction vector utilized to determine frame slowness predictions).

For example, as shown in FIG. 5, the temporally varying video re-timing system 106 utilizes a video duration loss $\mathcal{L}_{sum}$, a minimum speed loss $\mathcal{L}_{min}$, a playback speed smoothness loss $\mathcal{L}_{smooth}$, and a playback speed prediction loss $\mathcal{L}_p$ as part of the loss objective when determining the sequence of frame skippings $d_i$ from the initial sub-sampling (or frame skippings) $d_{init}$. Indeed, the temporally varying video re-timing system 106 determines a sequence of frame skippings $d_i$ that minimizes (e.g., below a threshold loss) the objective loss $\mathcal{L}_d$ in accordance with the following objective:

$$\mathcal{L}_d = \mathcal{L}_p \lambda_{sum} \mathcal{L}_{sum} + \lambda_{min} \mathcal{L}_{min} + \lambda_{smooth} \mathcal{L}_{smooth} \quad (11)$$

As just mentioned, in one or more embodiments, the temporally varying video re-timing system 106 utilizes a video duration loss $\mathcal{L}_{sum}$ as part of the objective loss $\mathcal{L}_d$ of function (11). In particular, the temporally varying video re-timing system 106 utilizes the video duration loss $\mathcal{L}_{sum}$ to enforce that the sequence of frame skippings $d_i$ results in a video frame sub-sampling that covers the entire digital video. In some embodiments, the temporally varying video re-timing system 106 utilizes a video duration loss $\mathcal{L}_{sum}$ for a sequence of frame skippings $d_i$, a digital video duration n, and a target video duration l in accordance with the following function:

$$\mathcal{L}_{sum} = \left|\sum_{i=1}^{l} d_i - n\right|^2 \quad (12)$$

In one or more embodiments, the temporally varying video re-timing system 106 further utilizes a user configured parameter $\lambda_{sum}$ as part of the video duration loss $\mathcal{L}_{sum}$.

Moreover, in some implementations, the temporally varying video re-timing system 106 utilizes a minimum speed loss $\mathcal{L}_{min}$ as part of the objective loss $\mathcal{L}_d$ of function (11). In one or more embodiments, the temporally varying video re-timing system 106 utilizes the minimum speed loss $\mathcal{L}_{min}$ to ensure frames are not slowed down from a default playback speed of the original version of the digital video (i.e., a minimum original speed is preserved) in the sequence of frame skippings $d_i$. For instance, the temporally varying video re-timing system 106 utilizes a minimum speed loss $\mathcal{L}_{min}$ for a sequence of frame skippings $d_i$ and a target video duration l in accordance with the following function:

$$\mathcal{L}_{min} = \sum_{i=1}^{l} \max(0, 1 - d_i) \quad (13)$$

In certain instances, the temporally varying video re-timing system 106 further utilizes a user configured parameter $\lambda_{min}$ as part of the video duration loss $\mathcal{L}_{min}$.

Furthermore, in one or more embodiments, the temporally varying video re-timing system 106 utilizes a playback speed smoothness loss $\mathcal{L}_{smooth}$ as part of the objective loss $\mathcal{L}_d$ of function (11). To illustrate, in some embodiments, the temporally varying video re-timing system 106 utilizes the playback speed smoothness loss $\mathcal{L}_{smooth}$ to control the smoothness of playback speed changes (e.g., frame skips) in the sequence of frame skippings $d_i$. For example, the temporally varying video re-timing system 106 utilizes a playback speed smoothness loss $\mathcal{L}_{smooth}$ for a sequence of frame skippings $d_i$ and a target video duration l in accordance with the following function:

$$\mathcal{L}_{smooth} = \sum_{i=1}^{l-1} |d_{i+1} - d_i|^2 \quad (14)$$

In one or more embodiments, the temporally varying video re-timing system 106 further utilizes a user configured parameter $\lambda_{smooth}$ as part of the video duration loss $\mathcal{L}_{smooth}$.

Additionally, in one or more implementations, the temporally varying video re-timing system 106 utilizes a playback speed prediction loss $\mathcal{L}_p$ as part of the objective loss $\mathcal{L}_d$ of function (11) to determine a sequence of frame skippings $d_i$ that is consistent with varying predicted playback speeds (e.g., via frame slowness predictions from a varying playback speed prediction vector). To illustrate, the temporally varying video re-timing system 106 utilizes the playback speed prediction loss $\mathcal{L}_p$ to penalize speedups that exceed an estimated per-frame slowness predictions (as described in functions (7)-(9)) of the digital video while determining the sequence of frame skippings $d_i$. In particular, in one or more embodiments, the temporally varying video re-timing system 106 determines a playback speed prediction loss $\mathcal{L}_p$ utilizing frame slowness predictions p[i,j] (e.g., from function (9)) with the sequence of frame skippings $d_i$ and an estimate video frame sub-sampling v from the sequence of frame skippings $d_i$ (as described in function (10) in accordance with the following function:

$$\mathcal{L}_p = \sum_{i=1}^{l-1} \sum_{j=0}^{k} p[v_i, j] \max(0, d_i - 2^{k-j}) \quad (15)$$

Furthermore, in one or more embodiments, the temporally varying video re-timing system 106 utilizes frame slowness predictions p that are indexed for the estimate video frame sub-sampling v from the sequence of frame skippings $d_i$ while performing the iterative objective on the sequence of frame skippings $d_i$. In particular, the temporally varying video re-timing system 106, by utilizing frame slowness predictions p that are indexed for the estimate video frame sub-sampling v, ensures that the final video frame sub-sampling is consistent with the frame slowness predictions determined from the playback speed prediction vector of the original video (e.g., determined from interpolation as described above).

In one or more embodiments, the temporally varying video re-timing system 106 selects sequences of frame skippings $d_i$ to minimize the loss objective (as described in function (11)) such that the sequence of frame skippings $d_i$ is consistent with the with the slowness predictions from the varying playback speed prediction vector while also fitting the target video duration. For instance, the temporally varying video re-timing system 106 iteratively determines sequences of frame skippings $d_i$ until a resulting loss objective is below a threshold loss. In some cases, the temporally varying video re-timing system 106 can identify a user configured threshold loss for the loss objective.

In one or more embodiments, the temporally varying video re-timing system 106 further modifies the confidence of slowness predictions while utilizing the loss objective to determine the sequence of frame skippings $d_i$. To illustrate, in some cases, the temporally varying video re-timing system 106 modifies a softmax temperature of a range of predicted frame slowness to increase confidence of the slowness predictions. As an example, the temporally varying video re-timing system 106 lowers a softmax temperature such that max(p)−min(p)>0.975 (e.g., to ensure consistent behavior in the determination of the sequence of frame skippings $d_i$).

Furthermore, in some cases, the temporally varying video re-timing system 106 utilizes an iterative solver with the loss objective to determine the sequence of frame skippings $d_i$ is consistent with the with the slowness predictions from the varying playback speed prediction vector while also fitting the target video duration. For example, in some cases, the temporally varying video re-timing system 106 utilizes a gradient descent using an Adam optimizer to determine the sequence of frame skippings $d_i$. In one or more instances, the temporally varying video re-timing system 106 utilizes various stochastic gradient descent based iterative solvers with the loss objective to determine the sequence of frame skippings $d_i$ is consistent with the with the slowness predictions from the varying playback speed prediction vector.

In one or more embodiments, the temporally varying video re-timing system 106 receives a target video duration from a user selection. For instance, the temporally varying video re-timing system 106 receives a request from a user to re-time a digital video with a target video duration selection (e.g., via a text input, slider tool, dropdown menu). In some cases, the temporally varying video re-timing system 106 receives a request from a user to re-time a digital video to meet a video duration requirement of a third-party system. For example, in some embodiments, the temporally varying video re-timing system 106 identifies a target video duration (as an upload constraint) from a social networking platform, a video streaming service, and/or a cloud storage service (e.g., as described in relation to the third-party server device(s) 116 of FIG. 1).

Additionally, in some cases, the temporally varying video re-timing system 106 identifies a target video duration from a user selection of audio content to combine with a digital video. In particular, the temporally varying video re-timing system 106 receives digital audio content and determines a source duration of the audio content. Subsequently, the temporally varying video re-timing system 106 utilizes the source duration of the audio content as the target video duration. Indeed, in one or more embodiments, the temporally varying video re-timing system 106 combines the digital video with the digital audio content by re-timing the digital video (as described herein) utilizing the source duration of the audio content.

Figure 6:
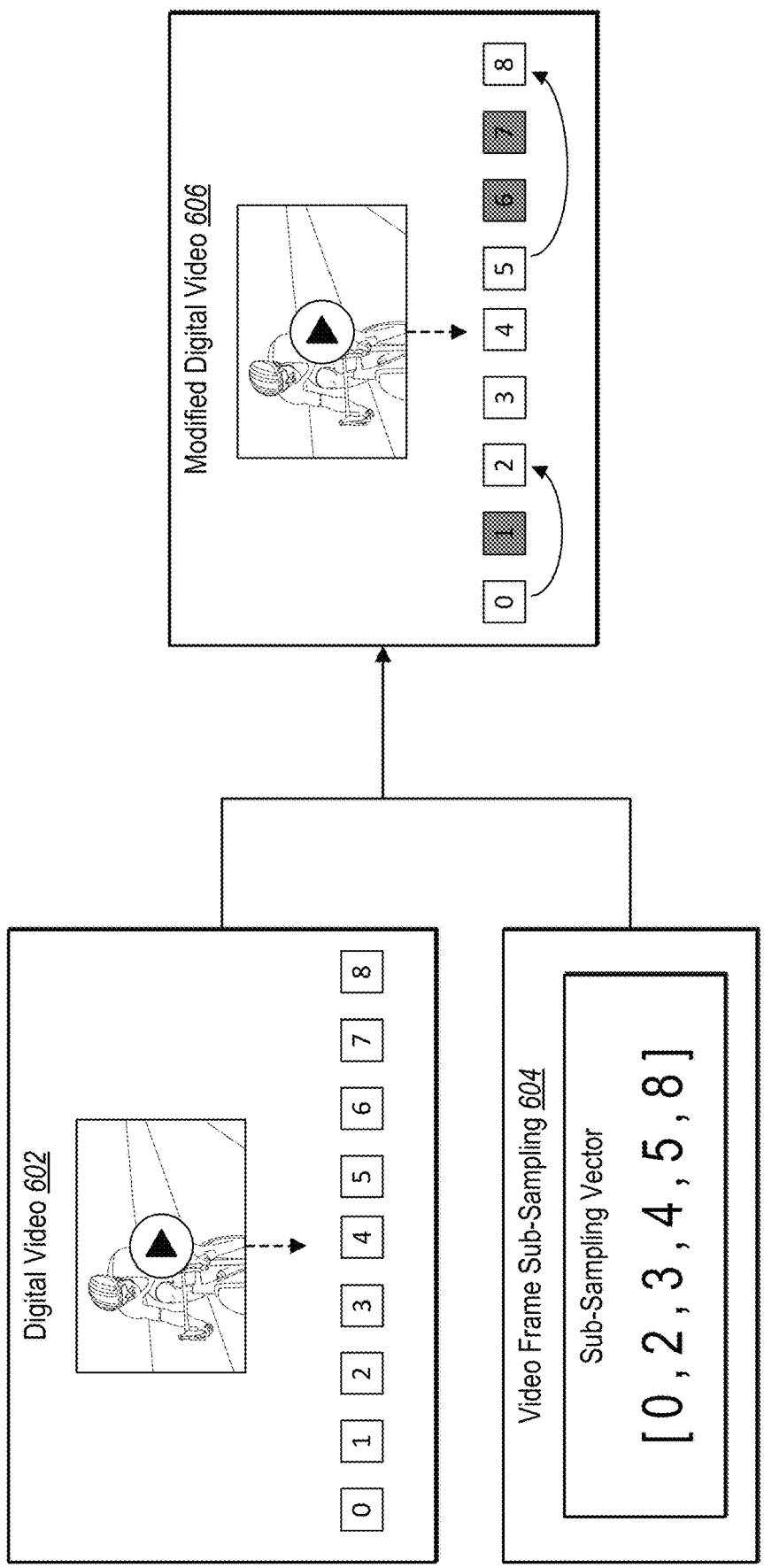
FIG. 6 illustrates a temporally varying video re-timing system generating a modified digital video with temporally varying playback speeds in accordance with one or more implementations.

As mentioned above, in one or more embodiments, the temporally varying video re-timing system 106 generates a modified digital video with temporally varying playback speeds utilizing a determined video frame sub-sampling. For instance, FIG. 6 illustrates the temporally varying video re-timing system 106 utilizing a digital video with the determined video frame sub-sampling to generate a modified digital video with temporally varying playback speeds to fit a target video duration. As shown in FIG. 6, the temporally varying video re-timing system 106 utilizes a video frame sub-sampling 604 (e.g., sub-sampling vector as described in function (10)) to select frames of the digital video 602. Indeed, as shown in FIG. 6, the temporally varying video re-timing system 106 generates a modified digital video 606 that skips frames 1, 6, and 7 based on a sub-sampling vector v=[0, 2, 3, 4, 5, 8] (e.g., non-skipped frames) to re-time the digital video 602.

In one or more embodiments, the temporally varying video re-timing system 106 generates a modified digital video that re-times a digital video such that the modified digital video has temporally varying playback speeds while fitting a target video duration. For example, in some cases, the temporally varying video re-timing system 106 removes different amounts of frames from different segments of frames of the digital video to generate a modified digital video having temporally varying playback speeds. In other words, in one or more embodiments, the temporally varying video re-timing system 106 generates the modified digital video with different playback speeds at different segments of frames of the digital video to fit the target video duration while preserving natural video dynamics.

As described above, the temporally varying video re-timing system 106 modifies a digital video with temporally varying playback speeds (in accordance with one or more embodiments) to fit a target video duration for a variety of applications. For instance, the temporally varying video re-timing system 106 modifies the digital video with temporally varying playback speeds to condense the digital video for upload into third-party services with digital video duration (or size) restrictions. As an example, the temporally varying video re-timing system 106 generates the modified digital video with temporally varying playback speeds to upload the modified digital video into a streaming service or a social media platform that imposes a video duration restriction. In some cases, the temporally varying video re-timing system 106 generates the modified digital video with temporally varying playback speeds to upload the modified digital video into a cloud service that imposes a size restriction.

As mentioned above, the temporally varying video re-timing system 106, in contrast to conventional systems that apply uniform playback speeds, the temporally varying video re-timing system accurately determines video sub-samples that satisfy a target video duration while preserving natural video dynamics in the sped-up digital video through localized and temporally varying playback speeds. For instance, FIGS. 7A and 7B illustrate differences between a digital video with localized and temporally varying playback speeds (in accordance with one or more embodiments) in comparison to a conventional system that applies a uniform playback speed. For example, as shown in FIG. 7A, the temporally varying video re-timing system 106 generates a modified digital video with video frames 702 that utilizes non-uniform playback speeds 704 within playback speeds 706 to fit a target video duration. In contrast, as shown in FIG. 7B, some conventional systems generate a modified digital video with video frames 708 that utilize a uniform playback speed 712 within playback speeds 710.

Figure 8:
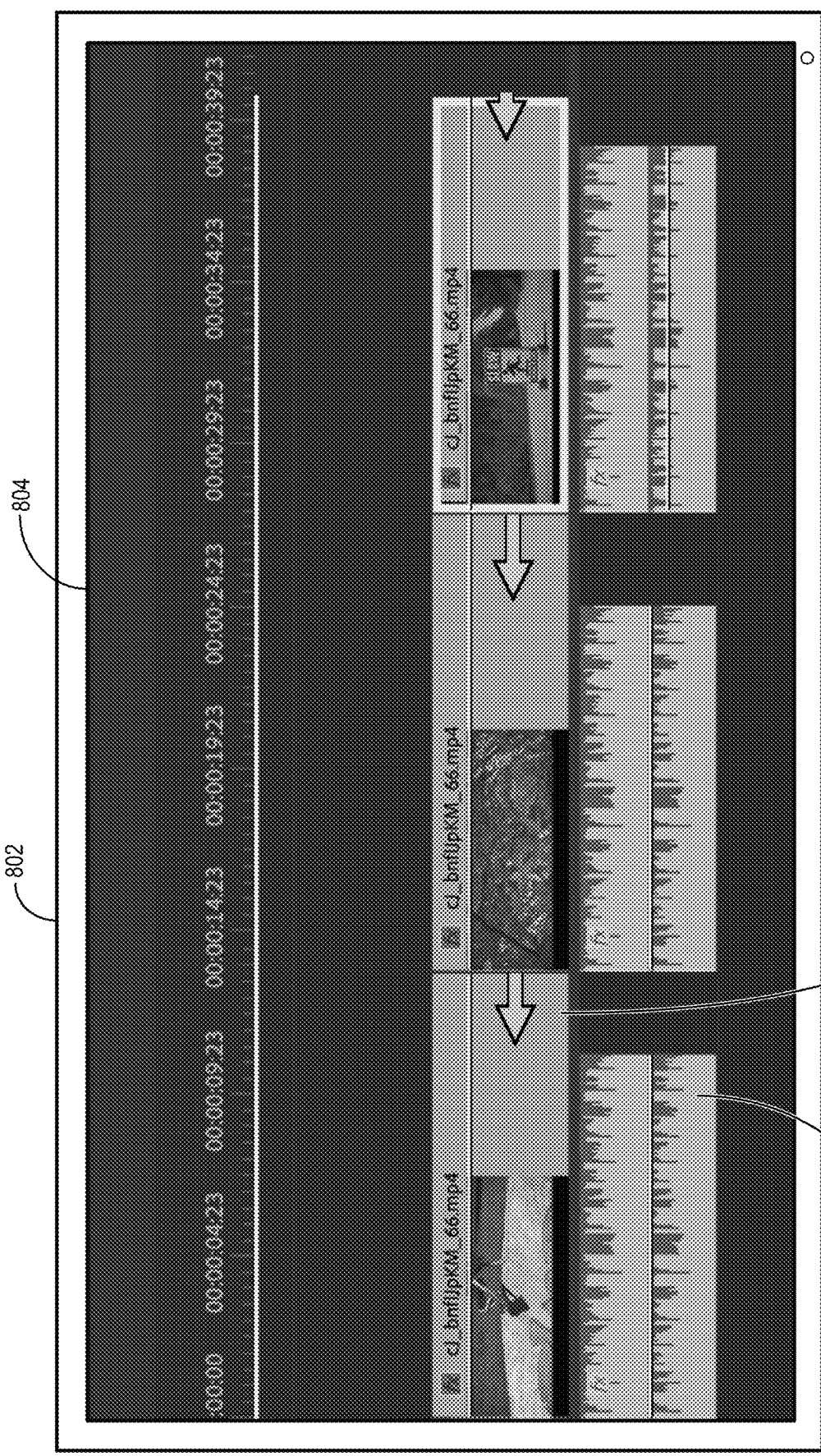
FIG. 8 illustrates a temporally varying video re-timing system re-timing a digital video to combine audio content with the digital video in accordance with one or more implementations.

As mentioned above, in some cases, the temporally varying video re-timing system 106 modifies a digital video with temporally varying playback speeds to fit an audio duration of audio content that is combined with the digital video. For example, FIG. 8 illustrates the temporally varying video re-timing system 106 combining audio content with a digital video by modifying a digital video with temporally varying playback speeds to fit an audio duration of audio content. As shown in FIG. 8, the temporally varying video re-timing system 106 provides, for display within a graphical user interface 804 of a client device 802, a timeline with a digital video clip 808 and a user selected audio content clip 806. In one or more embodiments, the temporally varying video re-timing system 106 modifies the digital video clip 808 by utilizing varying playback speeds (as described above) to fit a target video duration determined by the audio duration of the audio content clip 806.

As mentioned above, the temporally varying video re-timing system 106 accurately and efficiently determines video sub-samples that satisfy a target video duration while preserving natural video dynamics in the sped-up digital video through localized and temporally varying playback speeds for a flexible number of videos and video durations. For instance, experimenters utilized an implementation of the temporally varying video re-timing system (as described above) to compare results with various conventional digital video modification systems. Indeed, the experimenters performed experiments to verify the effectiveness of both a temporally varying frame speediness prediction (from a playback speed machine-learning model as described herein) and a video re-timing model that modifies digital videos to fit target video durations consistent with inferred frame slowness predictions.

For example, in order to evaluate the effectiveness of a playback speed machine-learning model (in accordance with one or more implementations), the experimenters artificially re-sampled unseen test videos of Kinetics (e.g., Kinetics-U and Kinetics-V) (in accordance with one or more implementations herein) to generate test data consisting of videos with $2^{y_i}$ playback speeds for $y_i$ speed classes. Indeed, the experimenters utilizes a playback speed prediction machine-learning model (in accordance with one or more implementations herein) to predict playback speed classifications for the test data. Additionally, the experimenters also utilized a sliding window model based on similar network architecture trained on uniformly sped-up video clips (with the same speed classes).

Indeed, as shown in the Table 1 below, the playback speed prediction machine-learning model (in accordance with one or more implementations herein) resulted in better performance in terms of mean classification accuracy in comparison to the sliding window model. Moreover, as the temporal windows increased (i.e., a number of input frames), the playback speed prediction machine-learning model improves in mean classification accuracy (especially in the Kinetics-V dataset which requires more localization). In addition, as shown in Table 1 below, the playback speed prediction machine-learning model (in accordance with one or more implementations herein) resulted in improved efficiency in regard to runtime in comparison to the sliding window model.

TABLE 1

| Method | Test Dataset | | |
| --- | --- | --- | --- |
|  | Kinetics-U | Kinetics-V | Run-time |
| Sliding (w = 8) | 73.6 | 61.9 | 12× |
| Sliding (w = 16) | 82.8 | 62.9 |  |
| Sliding (w = 32) | 87.0 | 59.6 |  |
| Temporally varying video re-timing system (w = 8) | 79.6 | 83.6 | 1× |
| Temporally varying video re-timing system (w = 16) | 81.2 | 85.6 |  |
| Temporally varying video re-timing system (w = 32) | 82.6 | 87.4 |  |

Additionally, to evaluate the accuracy of a video re-timing model (in accordance with one or more implementations), experimenters sampled sets of ground truth target frame skips and produce corresponding slowness predictions that correspond to perfect predictions of the frame speed for the ground truth target frame skips (for a set of test videos). Moreover, the experimenters utilize a temporally varying video re-timing system (in accordance with one or more implementations) to determine sequences of frame skippings that are consistent with frame slowness predictions and compares the sequences of frame skippings to the ground truth target frame skips. In addition, the experimenters utilized a naïve uniform speed-up approach and a SpeedNet approach as described in Benaim, Speednet: Learning the Speediness in Videos, Proceedings of the IEEE/CVF Conference on Computer Vision and Pattern Recognition (2020), which is hereby incorporated by reference in its entirety, with the same training videos and ground truth target frame skips. Indeed, the experimenters determined mean absolute errors between the predicted sequence of frame skips and the ground truth target frame skips. As shown in Table 2 below, the temporally varying video re-timing system (in accordance with one or more implementations) performed better than uniform speed-up approach and the SpeedNet approach in mean absolute error. In addition, as shown in Table 2, the temporally varying video re-timing system also performs better across various clip durations.

TABLE 2

| Method | Clip Duration | | |
|---|---|---|---|
| | 20 sec | 1 min | 3 min |
| Uniform Speed-up | 0.934 | 0.907 | 0.917 |
| SpeedNet | 0.229 | 0.366 | 0.439 |
| Temporally varying video re-timing system | 0.156 | 0.227 | 0.239 |

Figure 9:
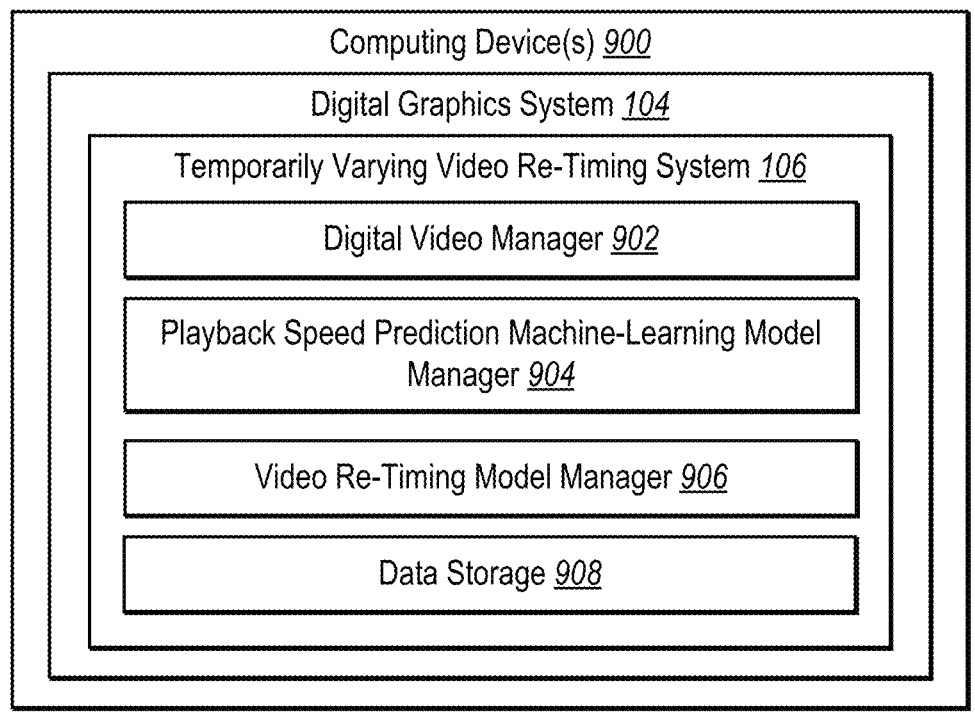
FIG. 9 illustrates a schematic diagram of a temporally varying video re-timing system in accordance with one or more implementations.

Turning now to FIG. 9, additional detail will be provided regarding components and capabilities of one or more embodiments of the temporally varying video re-timing system. In particular, FIG. 9 illustrates an example temporally varying video re-timing system 106 executed by a computing device 900 (e.g., the server device(s) 102 or the client device 110). As shown by the embodiment of FIG. 9, the computing device 900 includes or hosts the digital graphics system 104 and the temporally varying video re-timing system 106. Furthermore, as shown in FIG. 9, the temporally varying video re-timing system 106 includes a digital video manager 902, a playback speed prediction machine-learning model manager 904, a video re-timing model manager 906, and a data storage manager 908.

As just mentioned, and as illustrated in the embodiment of FIG. 9, the temporally varying video re-timing system 106 includes the digital video manager 902. For example, the digital video manager 902 identifies, stores, and/or displays digital videos as described above (e.g., in relation to FIGS. 1 and 2). Furthermore, in some instances, the digital video manager 902 receives target video durations to re-time digital videos as described above (e.g., in relation to FIGS. 1, 2, and 8).

Moreover, as shown in FIG. 9, the temporally varying video re-timing system 106 includes the playback speed prediction machine-learning model manager 904. For example, the playback speed prediction machine-learning model manager 904 trains a playback speed prediction machine-learning model utilizing a self-supervising approach with sampled digital videos as described above (e.g., in relation to FIG. 3). In addition, in one or more embodiments, the playback speed prediction machine-learning model manager 904 determines varying predicted playback speeds (using playback speed prediction vectors that translate to frame slowness predictions) as described above (e.g., in relation to FIG. 4).

Additionally, as shown in FIG. 9, the temporally varying video re-timing system 106 includes the video re-timing model manager 906. For instance, the video re-timing model manager 906 utilizes a varying predicted playback speeds with a target video duration to determine a video frame sub-sampling with temporally varying playback speeds (e.g., via frame slowness predictions) to fit within the target video duration as described above (e.g., in relation to FIG. 5). In one or more embodiments, the video re-timing model manager 906 utilizes the video frame sub-sampling to generate a speed varying digital video (from the digital video) that satisfies a target video duration while preserving natural video dynamics via different playback speeds at different segments of the digital video as described above (e.g., in relation to FIGS. 6 and 8).

As further shown in FIG. 9, the temporally varying video re-timing system 106 includes the data storage manager 908. In some embodiments, the data storage manager 908 maintains data to perform one or more functions of the temporally varying video re-timing system 106. For example, the data storage manager 908 includes digital videos, re-timed digital videos, playback speed prediction vectors, frame slowness predictions, and/or components of a playback speed prediction machine-learning model.

Each of the components 902-908 of the computing device 900 (e.g., the computing device 900 implementing the temporally varying video re-timing system 106), as shown in FIG. 9, may be in communication with one another using any suitable technology. The components 902-908 of the computing device 900 can comprise software, hardware, or both. For example, the components 902-908 can comprise one or more instructions stored on a computer-readable storage medium and executable by processor of one or more computing devices. When executed by the one or more processors, the computer-executable instructions of the temporally varying video re-timing system 106 (e.g., via the computing device 900) can cause a client device and/or server device to perform the methods described herein. Alternatively, the components 902-908 and their corresponding elements can comprise hardware, such as a special purpose processing device to perform a certain function or group of functions. Additionally, the components 902-908 can comprise a combination of computer-executable instructions and hardware.

Furthermore, the components 902-908 of the temporally varying video re-timing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are either registered trademarks or trademarks of Adobe Inc. in the United States and/or other countries.

Figure 10:
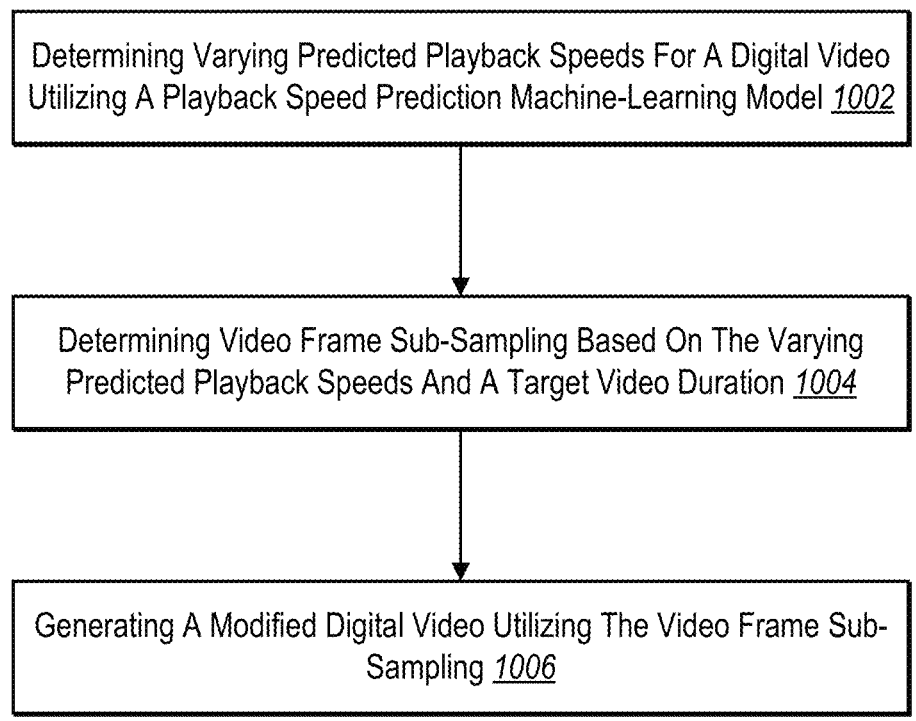
FIG. 10 illustrates a flowchart of a series of acts for generating a speed varying digital video in accordance with one or more implementations.

FIGS. 1-9, the corresponding text, and the examples provide a number of different methods, systems, devices, and non-transitory computer-readable media of the temporally varying video re-timing system 106. In addition to the foregoing, one or more embodiments can also be described in terms of flowcharts comprising acts for accomplishing a particular result, as shown in FIG. 10. The acts shown in FIG. 10 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 10. In some embodiments, a system can be configured to perform the acts of FIG. 10. Alternatively, the acts of FIG. 10 can be performed as part of a computer implemented method.

As mentioned above, FIG. 10 illustrates a flowchart of a series of acts 1000 for generating a speed varying digital video in accordance with one or more implementations. While FIG. 10 illustrates acts according to one embodiment, alternative embodiments may omit, add to, reorder, and/or modify any of the acts shown in FIG. 10.

As shown in FIG. 9, the series of acts 1000 include an act 1002 of determining varying predicted playback speeds for a digital video utilizing a playback speed prediction machine-learning model. In some embodiments, the act 1002 includes determining, utilizing a playback speed prediction machine-learning model, varying predicted playback speeds of frames of a digital video. In one or more embodiments, the act 1002 includes learning parameters of a playback speed prediction machine-learning model utilizing sample sequences of frame skippings.

Furthermore, in some instances, the act 1002 includes generating (utilizing a playback speed prediction machine-learning model) a varying playback speed prediction vector that includes varying speed classifications for frames of a digital video based on likelihoods of observing changes in playback speed between the frames of the digital video. Moreover, in some cases, the act 1002 includes determining frame slowness predictions for frames of the digital video utilizing an interpolated varying playback speed prediction vector. For example, frame slowness predictions indicate a likelihood of frames receiving an increase in playback speed.

Additionally, in some instances, the act 1002 includes generating an initial varying playback speed prediction vector comprising initial varying speed classifications for a sped-up version of a digital video of a sped-up duration. In addition, in one or more instances, the act 1002 includes interpolating an initial varying playback speed prediction vector that includes initial varying speed classifications for a sped-up version of a digital video of a sped-up duration to an interpolated varying playback speed prediction vector comprising varying speed classifications of the sped-up version of the digital video for frames of a normal version of the digital video of a source duration. Furthermore, in certain instances, the act 1002 includes determining frame slowness predictions from playback speed classifications that indicate a likelihood of frames receiving an increase in playback speed.

Furthermore, as shown in FIG. 9, the series of acts 1000 include an act 1004 of determining a video frame sub-sampling based on the varying predicted playback speeds and a target video duration. In particular, in some cases, the act 1004 includes determining a video frame sub-sampling from frames of a digital video based on varying predicted playback speeds and a target video duration. In one or more embodiments, the act 1004 includes determining a video frame sub-sampling from frames of a digital video based on a varying playback speed prediction vector and a target video duration. Additionally, in some cases, the act 1004 includes determining a video frame sub-sampling from frames of digital video based on frame slowness predictions. Additionally, in one or more embodiments, the act 1004 includes determining a sequence of frame skippings utilizing a loss objective based on a varying playback speed prediction vector.

Moreover, in some instances, the act 1004 includes skipping one or more of the frames of a digital video using a sequence of frame skippings determined from varying predicted playback speeds and a target video duration. In some instances, the act 1004 includes determining a video frame sub-sampling by skipping one or more of frames of a digital video using a sequence of frame skippings determined from a varying playback speed prediction vector and a target video duration. Additionally, in one or more implementations, the act 1004 includes generating, based on the sequence of frame skippings, a subsampled index of non-skipped frames as a video frame sub-sampling. In some embodiments, the act 1004 includes determining a video frame sub-sampling of a duration equal to or less than a target video duration.

Additionally, in some embodiments, the act 1004 includes identifying a target video duration for a digital video. In some cases, the act 1004 includes determining a target video duration utilizing a source duration of digital audio content. In one or more implementations, the act 1004 includes identifying a target video duration from a social networking platform.

As shown in FIG. 9, the series of acts 1000 also include an act 1006 of generating a modified digital video utilizing the video frame sub-sampling. In particular, in one or more embodiments, the act 1006 includes generating a modified digital video with temporally varying playback speeds utilizing a video frame sub-sampling. Furthermore, in some instances, the act 1006 includes removing a first number of frames from a first segment of frames of a digital video and removing a second number of frames from a second segment of frames of a digital video. Moreover, in some embodiments, the act 1006 includes generating a modified digital video to include a first segment of frames for playback at a first playback speed and a second segment of frames for playback at a second playback speed. Additionally, in some instances, the act 1006, includes generating a speed varying digital video from a digital video utilizing a video frame sub-sampling. In some cases, the act 1006 includes combining a modified digital video with digital audio content.

In addition (or in alternative) to the acts above, the temporally varying video re-timing system 106 can also perform a step for determining a video frame sub-sampling for a digital video representing a version of a digital video that satisfies a target video duration. For example, the acts and algorithms described above in relation to FIGS. 4 and 5 can comprise the corresponding acts and algorithms for performing a step for determining a video frame sub-sampling for a digital video representing a version of a digital video that satisfies a target video duration.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
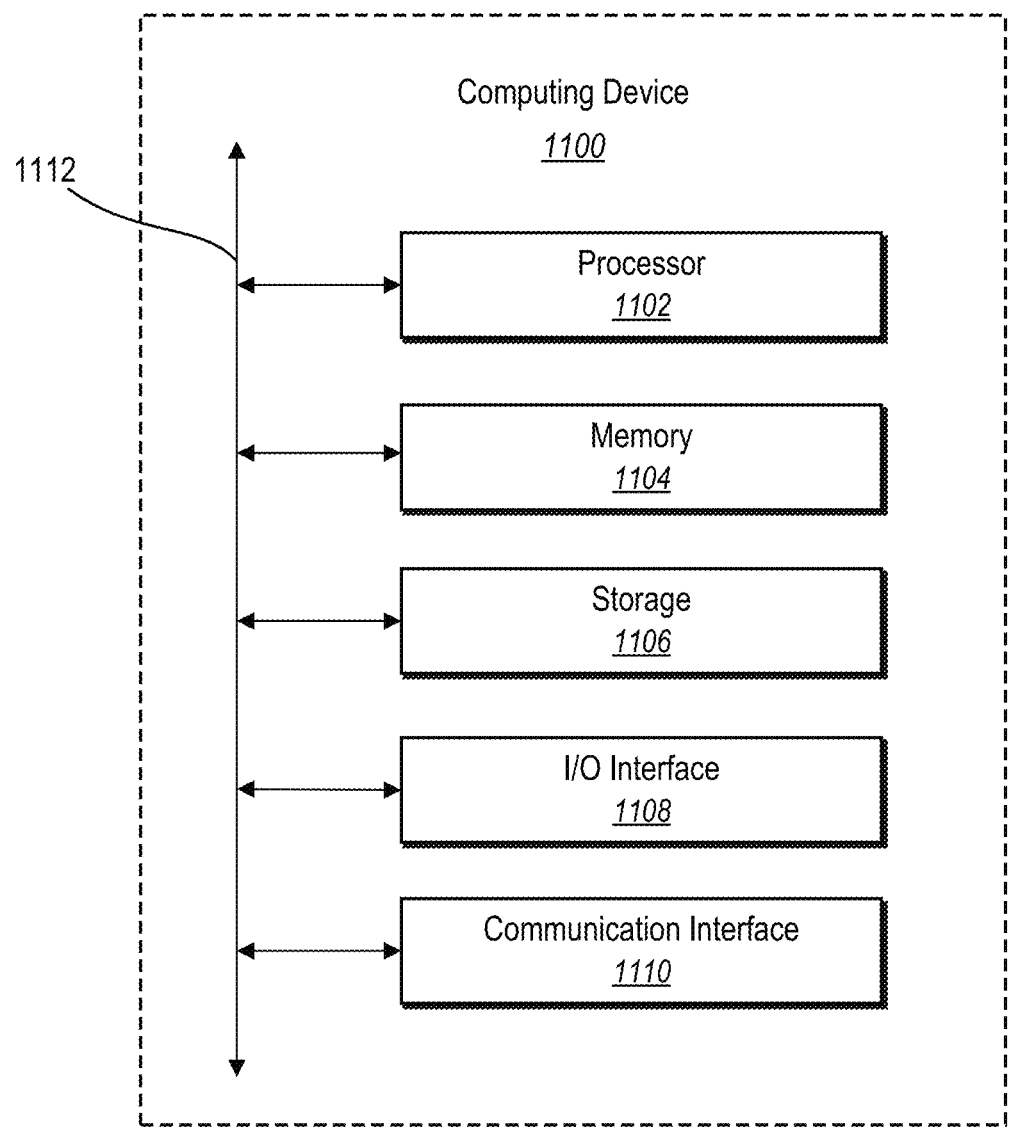
FIG. 11 illustrates a block diagram of an example computing device in accordance with one or more implementations.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 900, server device(s) 102, and/or client device 110). In one or more implementations, the computing device 1100 may be a mobile device (e.g., a mobile telephone, a smartphone, a PDA, a tablet, a laptop, a camera, a tracker, a watch, a wearable device, etc.). In some implementations, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG. 11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to perform operations comprising:
   identifying a target video duration for a digital video;
   determining, utilizing a playback speed prediction machine-learning model, varying predicted playback speeds of frames of the digital video;
   determining a video frame sub-sampling from the frames of the digital video based on the varying predicted playback speeds and the target video duration; and
   generating a modified digital video with temporally varying playback speeds utilizing the video frame sub-sampling.

2. The non-transitory computer-readable medium of claim 1, wherein determining the varying predicted playback speeds of frames of the digital video comprises generating a varying playback speed prediction vector comprising varying speed classifications for frames of the digital video based on likelihoods of observing changes in playback speed between the frames of the digital video.

3. The non-transitory computer-readable medium of claim 2, wherein generating the varying playback speed prediction vector comprises interpolating an initial varying playback speed prediction vector comprising initial varying speed classifications for a sped-up version of the digital video of a sped-up duration to an interpolated varying playback speed prediction vector comprising varying speed classifications of the sped-up version of the digital video for frames of a normal version of the digital video of a source duration.

4. The non-transitory computer-readable medium of claim 1, further comprising instructions that, when executed by the at least one processor, cause the computing device to perform operations comprising:
   determining the target video duration utilizing a source duration of digital audio content; and
   combining the modified digital video with the digital audio content.

5. The non-transitory computer-readable medium of claim 1, further comprising instructions that, when executed by the at least one processor, cause the computing device to perform operations comprising determining frame slowness predictions from playback speed classifications that indicate a likelihood of frames receiving an increase in playback speed.

6. The non-transitory computer-readable medium of claim 1, wherein determining the video frame sub-sampling comprises skipping one or more of the frames of the digital video using a sequence of frame skippings determined from the varying predicted playback speeds and the target video duration.

7. The non-transitory computer-readable medium of claim 6, wherein the instructions that, when executed by the at least one processor, further cause the computing device to perform operations comprising generating, based on the sequence of frame skippings, a subsampled index of non-skipped frames as the video frame sub-sampling.

8. The non-transitory computer-readable medium of claim 1, wherein determining the video frame sub-sampling comprises determining the video frame sub-sampling of a duration equal to or less than the target video duration.

9. The non-transitory computer-readable medium of claim 1, wherein generating the modified digital video comprises removing a first amount of frames from a first segment of frames of the digital video and removing a second amount of frames from a second segment of frames of the digital video.

10. The non-transitory computer-readable medium of claim 1, further comprising instructions that, when executed by the at least one processor, cause the computing device to perform operations comprising learning parameters of the playback speed prediction machine-learning model utilizing sample sequences of frame skippings.

11. A system comprising:
one or more memory devices comprising a digital video and a playback speed prediction machine-learning model; and
one or more processors configured to cause the system to:
identify a target video duration for the digital video;
generate, utilizing the playback speed prediction machine-learning model with the digital video, a varying playback speed prediction vector comprising varying speed classifications for frames of the digital video based on likelihoods of observing changes in playback speed between frames of the digital video;
determine a video frame sub-sampling from the frames of the digital video based on the varying playback speed prediction vector and the target video duration; and
generate a modified digital video with temporally varying playback speeds utilizing the video frame sub-sampling.

12. The system of claim 11, wherein the one or more processors are further configured to cause the system to generate the varying playback speed prediction vector by:
generating an initial varying playback speed prediction vector comprising initial varying speed classifications for a sped-up version of the digital video of a sped-up duration; and
interpolating the initial varying playback speed prediction vector to an interpolated varying playback speed prediction vector comprising varying speed classifications of the sped-up version of the digital video for frames of a normal version of the digital video of a source duration.

13. The system of claim 12, wherein the one or more processors are further configured to cause the system to:
determine frame slowness predictions for the frames of the digital video utilizing the interpolated varying playback speed prediction vector; and
determine the video frame sub-sampling from the frames of the digital video based on the frame slowness predictions.

14. The system of claim 11, wherein the one or more processors are further configured to cause the system to determine the video frame sub-sampling by skipping one or more of the frames of the digital video using a sequence of frame skippings determined from the varying playback speed prediction vector and the target video duration.

15. The system of claim 14, wherein the one or more processors are further configured to cause the system to generate, based on the sequence of frame skippings, a subsampled index of non-skipped frames of a duration equal to or less than the target video duration.

16. The system of claim 11, wherein the one or more processors are further configured to generate the modified digital video comprising a first segment of frames for playback at a first playback speed and a second segment of frames for playback at a second playback speed.

17. The system of claim 14, wherein the one or more processors are further configured to determine a sequence of frame skippings utilizing a loss objective based on the varying playback speed prediction vector.

18. A computer-implemented method comprising:
identifying a digital video and a target video duration;
performing a step for determining a video frame sub-sampling for the digital video representing a version of the digital video that satisfies the target video duration; and
generating a speed varying digital video from the digital video utilizing the video frame sub-sampling.

19. The computer-implemented method of claim 18, wherein identifying the target video duration comprises identifying the target video duration from a social networking platform.

20. The computer-implemented method of claim 18, further comprising generating the speed varying digital video to comprise a first segment of frames for playback at a first playback speed and a second segment of frames for playback at a second playback speed.

* * * * *